United States Patent
Satou

[19]

[11] Patent Number: 5,999,155
[45] Date of Patent: Dec. 7, 1999

[54] DISPLAY DEVICE, ELECTRONIC APPARATUS AND METHOD OF MANUFACTURING DISPLAY DEVICE

[75] Inventor: Takashi Satou, Suwa, Japan

[73] Assignee: Seiko Epson Corporation, Tokyo, Japan

[21] Appl. No.: 08/849,159

[22] PCT Filed: Sep. 27, 1996

[86] PCT No.: PCT/JP96/02814

§ 371 Date: Jul. 21, 1997

§ 102(e) Date: Jul. 21, 1997

[87] PCT Pub. No.: WO97/12277

PCT Pub. Date: Apr. 3, 1997

[30] Foreign Application Priority Data

Sep. 27, 1995 [JP] Japan ............................ 7-273474

[51] Int. Cl.⁶ .................................................. G09G 3/36
[52] U.S. Cl. .................................... 345/93; 345/92
[58] Field of Search ............................ 345/87, 90, 92, 345/93

[56] References Cited

U.S. PATENT DOCUMENTS 5,635,949  6/1997  Shiratsuki et al. .................... 345/93

FOREIGN PATENT DOCUMENTS 59-9962   1/1984  Japan .
1-282523  11/1989 Japan .
3-96923   4/1991  Japan .
4-56828   2/1992  Japan .
7-104311  4/1995  Japan .

Primary Examiner—Matthew Luu
Attorney, Agent, or Firm—Oliff & Berridge, PLC

[57] ABSTRACT

The invention provides a display device which improves the shape of the contact region while increasing yield and reducing product cost. A contact region is a region between signal lines, and is a region following a scan line so as to include either a part of or an entire of the pixel electrode edge region following the scan line connected to the switching element. The pixel electrode is connected to the source electrode in this region. The contact hole may be rectangular, and a plurality of contact holes may be provided. Also, if $C_X$ is the parasitic capacitance between the pixel electrode and the source electrode when a bad contact exists between said pixel electrode, $C_{0MAX}$ is the maximum value of the pixel capacitance held by the pixel electrode when said bad contact does not exist, $V_{LCMIN}$ is the voltage when the transmissivity at a pixel position is a minimum, and $V_{LCMAX}$ is the voltage when the transmissivity is a maximum, a capacitance ratio $RA_{C1}$ is set such that the following relationship is established: $RA_{C1}=C_X/C_{0MAX}>V_{LCMAX}/(V_{LCMIN}-V_{LCMAX})$. The invention thereby apparently eliminates a pixel defect of a bad contact.

19 Claims, 18 Drawing Sheets

DISPLAY DEVICE, ELECTRONIC APPARATUS AND METHOD OF MANUFACTURING DISPLAY DEVICE

BACKGROUND OF THE INVENTION

1. Field of the Invention

The present invention relates to a display device that uses a liquid crystal display element, as well as a method of manufacturing an electronic apparatus and display device which uses such a liquid crystal display element.

2. Description of Related Art

Recently, it has become desirable to reduce the cost of liquid crystal devices used for personal computers. Therefore, planning for the increased manufacturing yield resulting from this cost reduction has become an important technological issue. Preventing the panel pixel defects ("dot defects") and shortening the manufacturing process are also effective to increase manufacturing yield.

For example, Japanese Laid-Open Patent No. 4-155316 discloses a method of manufacturing a liquid crystal device. However, in this conventional method, the source electrode and the pixel electrode are on the same layer, and a protective insulation film is not interposed therebetween. Therefore, the problem arises that pixel defects tend to be generated due to shorts between the source electrode and the pixel electrode. The generation of pixel defects decreases yield and increases product cost.

In Japanese Laid-Open Patent No. 3-1648, the source electrode and the pixel electrode are not on the same layer, and a protective insulation film is interposed between them. The source electrode and the pixel electrode is connected through a contact hole. Therefore, in the prior art, any pixel defect due to shorts between the source electrode and the pixel electrode may not be easily generated. However, in the prior art, since a protective insulation is formed between the source electrode and the pixel electrode, it is necessary to form a contact hole connecting the source electrode and the pixel electrode, which increases the number of process steps. Furthermore, if the quality of the contact hole is poor, a pixel gap is formed, which decreases yield and increases product cost.

Thus, the conventional methods described above do not solve the technological problems such as increasing yield and reducing product cost.

DISCLOSURE OF INVENTION

An object of the invention is to solve the technological problems described above, and improve the contact region between the source electrode and the pixel electrode. Therefore, it is an object of the invention to provide a display device, an electronic apparatus and a method of manufacturing an electronic apparatus and display device to increase yield and reduce product cost.

In order to solve the above problems, the present invention relates to a display device including a pixel electrode for driving the display element and a switching element connected to the pixel electrode through a source electrode. A capacitance ratio $RA_{C1}$ is set such that the following relationship is established:

$$RA_{C1}=C_X/C_{0MAX}>V_{LCMAX}/(V_{LCMIN}-V_{LCMAX})$$

wherein:

$C_X$ is the parasitic capacitance between the pixel electrode and the source electrode when a bad contact exists between the pixel electrode;

$C_{0MAX}$ is the maximum value of the pixel capacitance held by the pixel electrode when said the contact does not exist;

$V_{LCMIN}$ is the voltage when the transmissivity at the pixel position is a minimum; and $V_{LCMAX}$ is the voltage when the transmissivity is a maximum.

In accordance with the invention, when a parasitic capacitance $C_X$ has occurred because of a bad contact, for example, in a normally-white display device, the pixel defects can be changed into a display tone shift, and it becomes possible to eliminate the pixel defects apparently. For example, the voltage of the pixel where the transmissivity is minimum $T_{MIN}$ "black display pixel" can be made to be greater than the voltage $V_{LCMAX}$ during maximum transmissivity. Consequently, this pixel becomes gray rather than white. If the display is gray, the invention makes it possible to eliminate the pixel defects apparently.

The capacitance ratio can be set by controlling various parameters, such as the overlapping surface area between the source electrode and the pixel electrode, the thickness of the insulating film, the material used, etc. When controlling the overlapping surface area, the surface area of the contact region at the edge region of the pixel electrode may be controlled. A storage capacitor may be included for the pixel capacitance of the invention or, alternatively, it may not be included.

In accordance with the invention, the capacitance ratio $RA_{C1}$ may be set such that:

$$RA_{C1}=C_X/C_{0MAX}>V_{LCHL}/(V_{LCMIN}-V_{LCHL})$$

wherein:

$V_{LCHL}$ is the voltage when the transmissivity in said pixel position becomes about 50% of the maximum transmissivity.

As a result, the transmissivity of a black display pixel, for example, can be made to be less than or equal to $T_{HL}$, which is approximately 50% of $T_{MAX}$. If the transmissivity is less than or equal to $T_{HL}$, the human eye detects almost no distinction from a black display. Consequently, the distinction becomes unnoticeable in the display to the human eye if great attention is not paid.

The pixel capacitance $C_0$ may change depending upon the voltage printed to the display element, for example, within the range $C_{0MIN}$–$C_{0MAX}$. In this case, instead of the above equation, the capacitance $RA_{C2}$ may be set such that:

$$RA_{C2}=C_X/C_{0MIN}>V_{LCMAX}/(V_{LCMIN}-V_{LCMAX}).$$

Also, in a normally-black display device, the above relationships change as shown below. Specifically, the capacitance is set such that:

$$RA_{C1}=C_X/C_{0MAX}>V_{LCMIN}/(V_{LCMAX}-V_{LCMIN});$$

or $$RA_{C1}=C_X/C_{0MAX}>V_{LCHL}/(V_{LCMAX}-V_{LCHL});$$

or $$RA_{C2}=C_X/C_{0MIN}>V_{LCMIN}/(V_{LCMAX}-V_{LCMIN}).$$

Thus, in a normally-black display device, the yield is increased and the product cost is reduced by preventing bad contacts.

The invention is also a display device having a pixel electrode for driving the display element and a switching element connected to the pixel electrode by a source electrode. This invention includes a contact region which is provided between a signal line connected to the switching element and another signal line adjacent to the signal line connected to the switching element so as to include a part or an entire of the pixel electrode edge region along the scan line connected to the switching element. Thereby the pixel electrode is connected to the source electrode in the contact region.

In accordance with the invention, a contact region is provided in a wide region included in a portion of or the entire pixel electrode edge region, therefore bad contacts are drastically reduced, which increases yield and reduces product cost. Moreover, this pixel electrode edge region is at the edge of the pixel electrode and extends in a direction following the scan line. The pixel electrode edge region can be covered easily by a black matrix and so on. Consequently, the invention reduces bad contacts from occurring without substantially sacrificing aperture, etc.

In accordance with the invention, the contact region does not have to be provided across the entire pixel electrode edge region. The contact region may be provided in a portion, for example half, of the pixel electrode edge region. It is desirable that the size of the contact region provided in the pixel electrode edge region be determined based on, for example as described above, the parasitic capacitance that occurs when a bad contact is generated, the pixel capacitance held by the pixel electrode, the voltage during minimum transmissivity and during maximum transmissivity, and other characteristics. In accordance with the invention, a portion of the contact region can be in a region outside of the pixel electrode edge region.

In accordance with the invention, the contact region may include a rectangular contact hole, the long side of which follows the scan line. The pixel electrode and the source electrode can be connected by the rectangular contact hole. The contact region can include multiple contact holes. The pixel electrode can be connected to the source electrode by the contact holes. A contact region of the desired surface area can be provided efficiently for the pixel electrode edge region by making a rectangular contact hole. Also, when multiple contact holes are provided, it is desirable that the number of contact holes in the direction following the scan line be greater than the number of contact holes in the direction following the signal line.

Also, in accordance with the invention, it is desirable that a black matrix region be provided to cover a portion of or the entire contact region. For example, when the source electrode is formed of a non-transparent material, the existence of the contact region becomes a factor in the reduction of aperture. The existence of the black matrix region provided for improving contrast becomes a factor in the reduction of aperture. Thus, by overlapping the contact region and the black matrix region, it becomes possible to reduce bad contacts and increase contrast, while minimizing the reduction of aperture. The black matrix region can be provided on the side of the opposing substrate or on the side of the switching element.

The method of manufacturing the display device in accordance with the invention can include forming the source electrode, forming a given insulation film above the source electrode, forming contact region for connecting at least the electrode and the pixel electrode, and forming the pixel electrode. Also, in the contact region formation process, it is desirable that the contact region for connecting an electrode formed of the same material as the gate electrode of the switching element and a given electrode be formed concurrently with the formation of the contact region for connecting the source electrode and the pixel electrode. As a result, the contact region can be formed between the source electrode and the pixel electrode at the same time as the formation of the contact region and "pad open," for example, when forming a protection diode, and it becomes possible to plan for the reduction of the number of processes.

DETAILED DESCRIPTION OF PREFERRED EMBODIMENTS

Embodiment 1

Figure 1A:
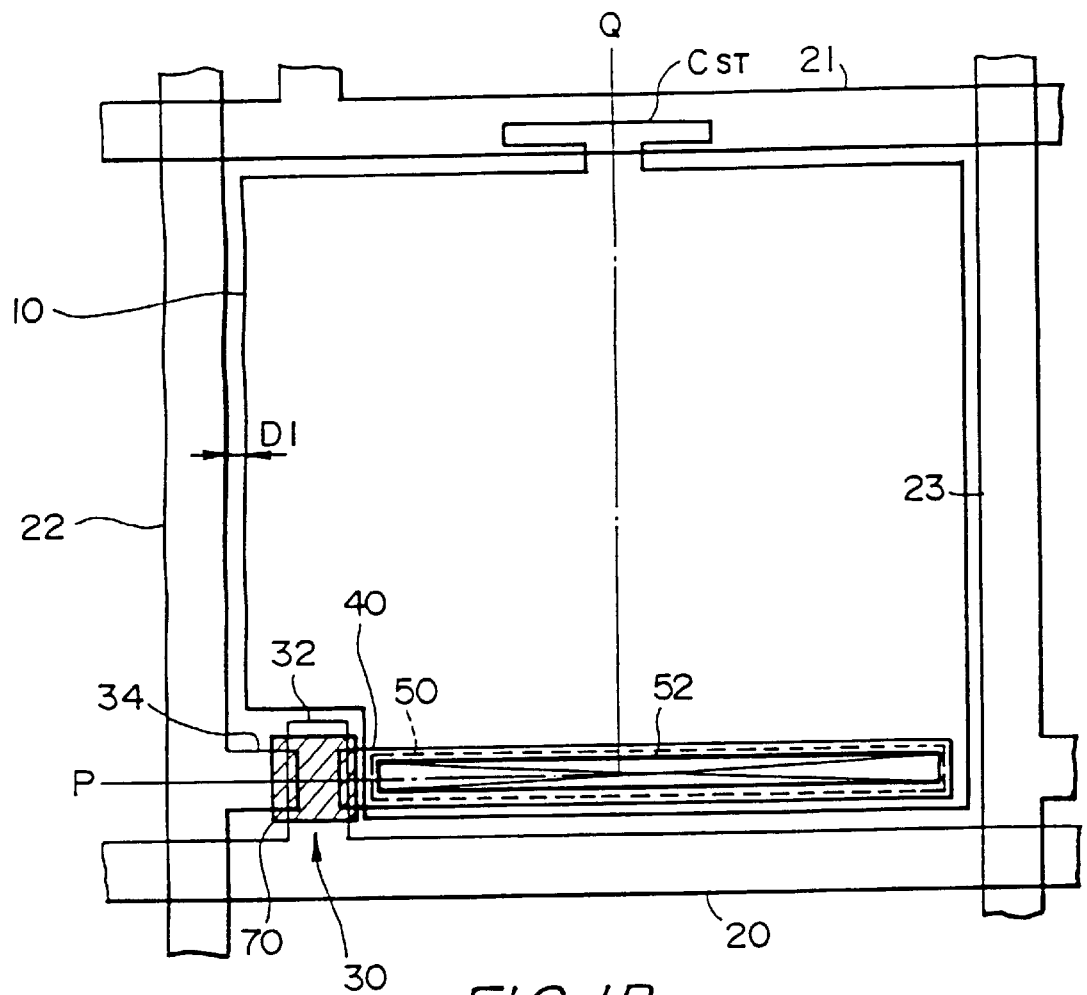
FIG. 1A shows a planar structure in accordance with Embodiment 1 of the invention.

Embodiment 1 of the invention relates to improving the shape, size and the other characteristics of the contact hole. FIG. 1A shows a planar structure in accordance with Embodiment 1 of the invention, and FIG. 1B is a cross-sectional view of P-Q portion of FIG. 1A.

Figure 1B:
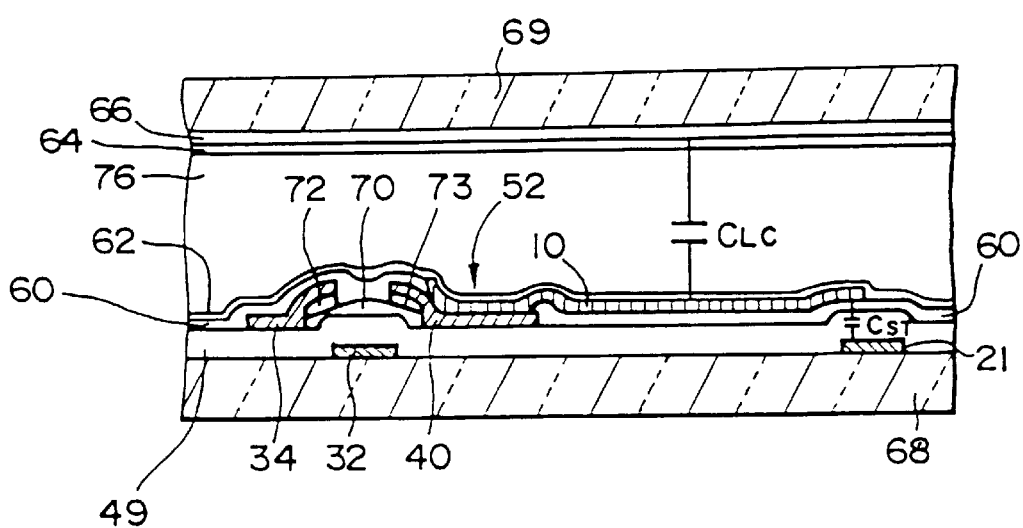
FIG. 1B is a cross sectional view of P-Q portion of the planar structure of FIG. 1A.

As shown in FIGS. 1A and 1B, the liquid crystal device of Embodiment 1 of the invention includes a pixel electrode 10 formed of ITO or similar material, and a thin film transistor 30, i.e., a switching element ("TFT") connected to the pixel electrode 10 by a source electrode 40. These elements drive a liquid crystal element 76 ("display element") interposed between these elements and the opposing substrate 66.

TFT 30 includes at least a gate electrode 32, a drain electrode 34, a source electrode 40, an intrinsic silicon film 70 not doped with impurities, and n-type silicon films 72 and 73 ("ohmic films"). Pixel electrode 10 is connected to source electrode 40 by a contact hole 52 inside a contact region 50. Gate electrode 32 and drain electrode 34 are connected to a scan line 20 and a signal line 22, respectively. A matrix-type liquid crystal display device is formed by placing multiple scan lines 20 and signal lines 22 crossing each other in a matrix pattern, and connecting TFT 30 to scan line 20 and signal line 22.

In accordance with the embodiment shown in FIG. 1B, a protective insulation film 60 ("passivation") is formed as an interlayer insulation film between source electrode 40 and pixel electrode 10. Also, a storage capacitor ("storage condenser") $C_{ST}$ is formed by making this insulation film 60 and gate insulation film 49 as an dielectric substance, pixel electrode 10 as an upper electrode, and the front-column scan line 21 as the lower electrode. However, the storage capacitors formed by subsequent columns of scan lines (not shown) with pixel electrodes is not explained or shown for expediency. Also, a liquid crystal capacitor ("liquid crystal condenser") $C_{LC}$ is formed by making liquid crystal element ("liquid crystal layer") 76 as an dielectric substance, opposing electrode 66 as the upper electrode, and pixel electrode 10 as the lower electrode. Pixel electrode 10 may be divided into sub-pixel electrodes so as to form a control condenser between given control electrodes.

Figure 2A:
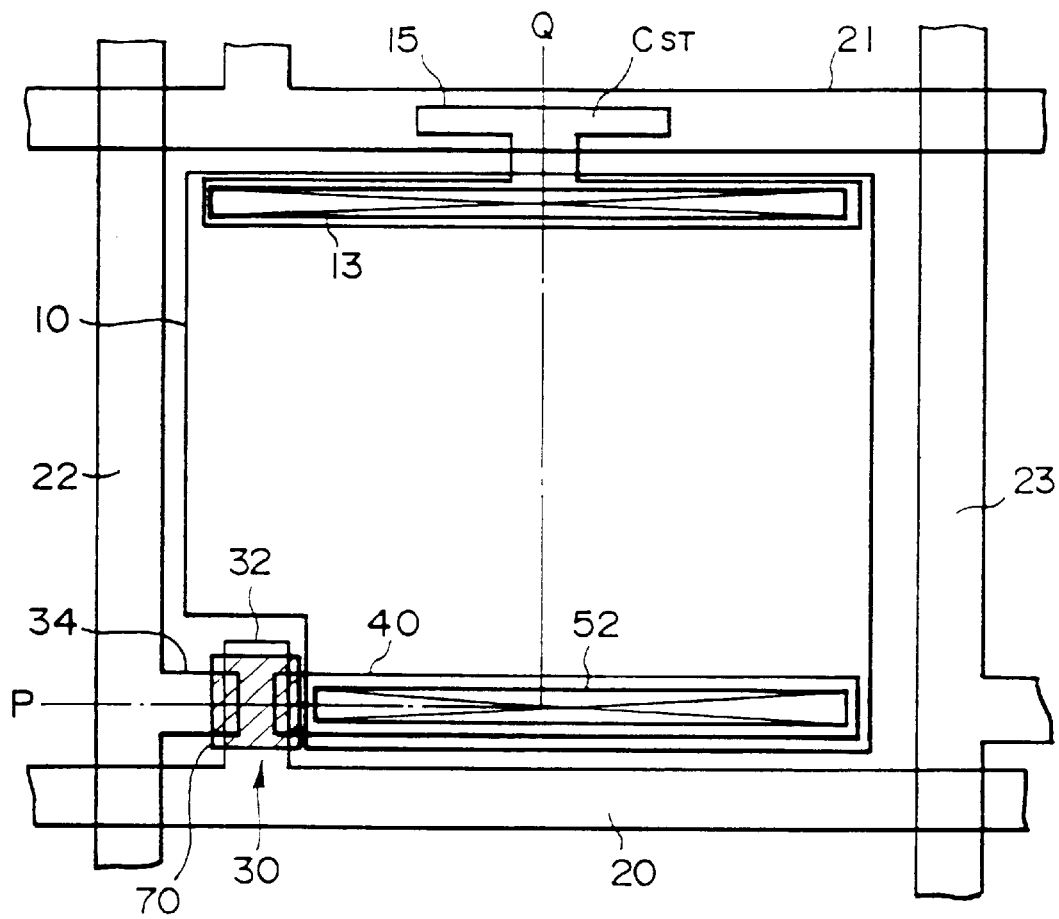
FIG. 2A and FIG. 2B show a planar structure in accordance with Embodiment 1 and a sectional view of Q-B portion of another embodiment (which is different in a method of forming a holding capacitance).
Figure 2B:
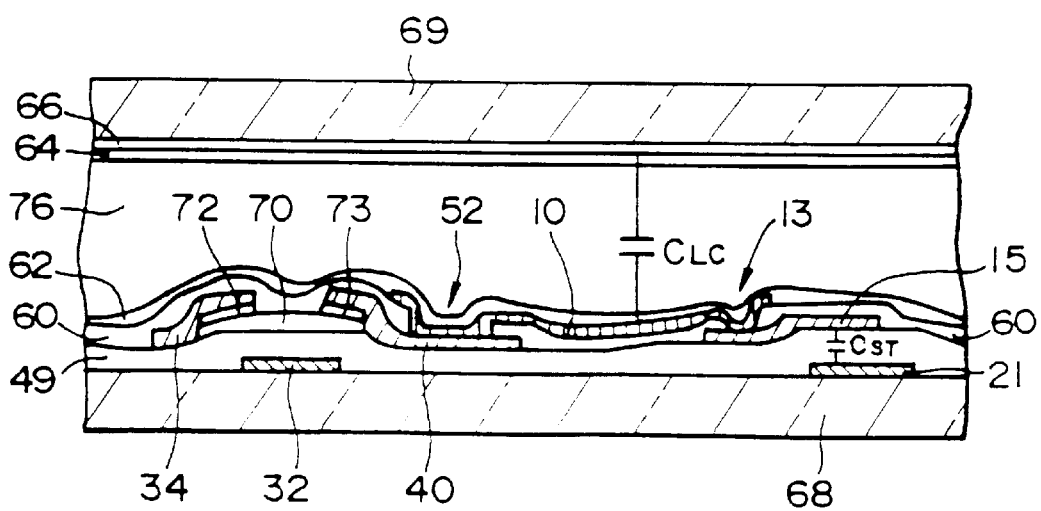

Numerous methods can be considered for configuring the storage capacitor. An example of one such method is shown in FIGS. 2A–2B. In FIGS. 2A–2B, pixel electrode 10 is connected to electrode 15 via contact hole 13, and storage capacitor $C_{ST}$ is formed between this electrode 15 and scan line 21. Here, electrode 15 is formed of the same material (same process) as source electrode 40, having a smaller side edge compared with ITO, and similar materials, being a material of pixel electrode 10. Consequently, it becomes possible to reduce the manufacturing uniformity of the storage capacitor by forming one electrode of the storage capacitor $C_{ST}$ of electrode 15.

The main characteristic of this embodiment is that contact region 50 is provided in a region between signal line 22 connected to TFT 30 and a signal line 23 adjacent to signal line 22, and so as to include either a portion of or the entire electrode edge region being a region following a scan line 30 connected to TFT 30. Forming contact region 50 in this manner reduces the number of bad contacts and makes it possible to plan for the improvement of yield and the reduction of product cost.

Figure 3:
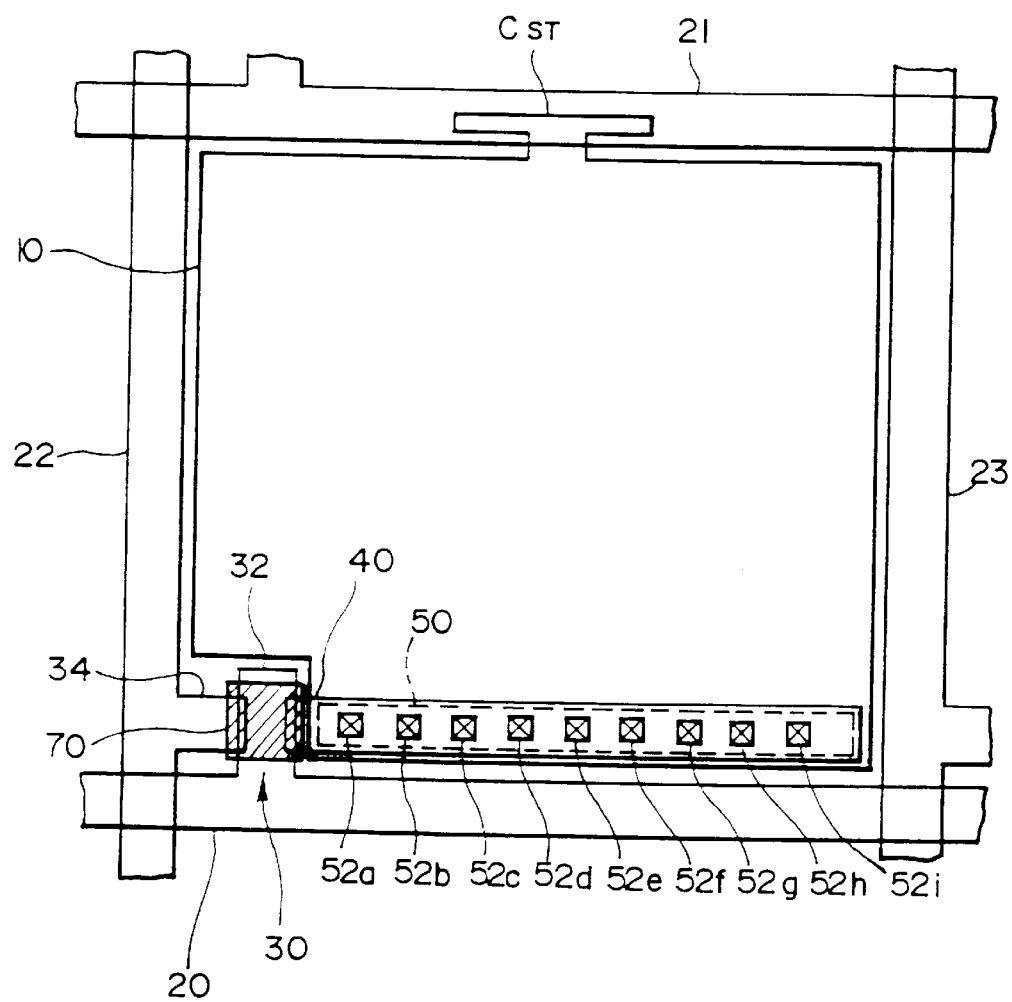
FIG. 3 shows another planar structure in accordance with Embodiment 1 of the invention.

Contact hole 52 in contact region 50 can be formed into numerous shapes. For example, it may be rectangular, wherein the long sides follow the scan line 20 as shown in FIG. 1A. Alternatively, the region may include a plurality of contact holes 52a–52i as shown in FIG. 3.

Also, a contact region 50 does not have to be provided across the entire region of the above-mentioned pixel electrode edge region. However, in the case of a rectangular contact hole, for example, it is desirable to provide the contact hole 50 across at least half of the pixel electrode edge region. When a plurality of contact holes are provided, it is desirable to provide two or more contact holes arrayed in the direction following the scan line. Also, as explained below regarding Embodiment 2, it is desirable that the surface area of the contact region be determined based on the parasitic capacitance $C_X$ occurring during the formation of a bad contact, the pixel capacitance $C_0$ held by the pixel electrode, the voltage $V_{LCMIN}$ and $V_{LCMAX}$ during minimum transmissivity and during maximum transmissivity.

Figure 4:
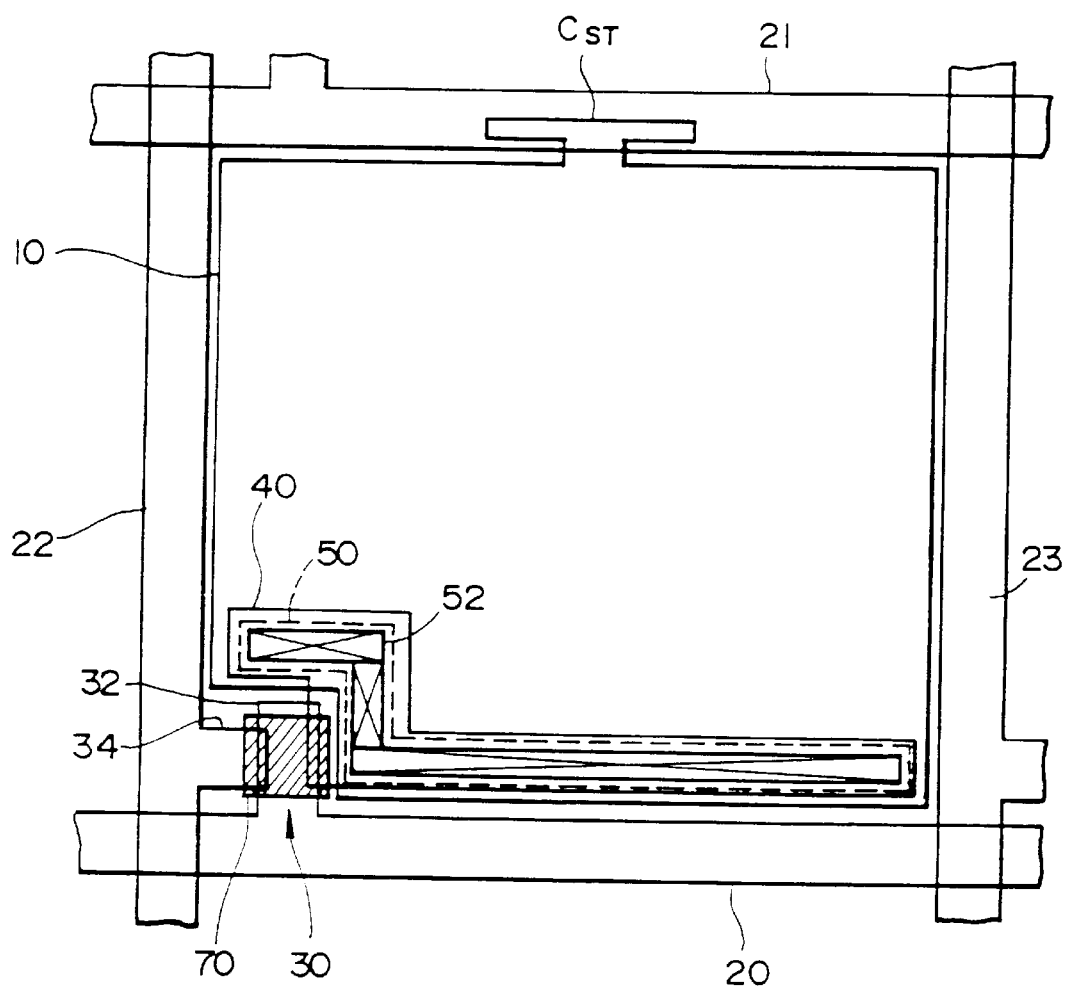
FIG. 4 shows another planar structure in accordance with Embodiment 1 of the invention.

Also, contact region 40 may include the pixel electrode edge region. As shown in FIG. 4, for example, a portion of contact region 50 can be in a region outside the pixel electrode edge region.

Figure 5:
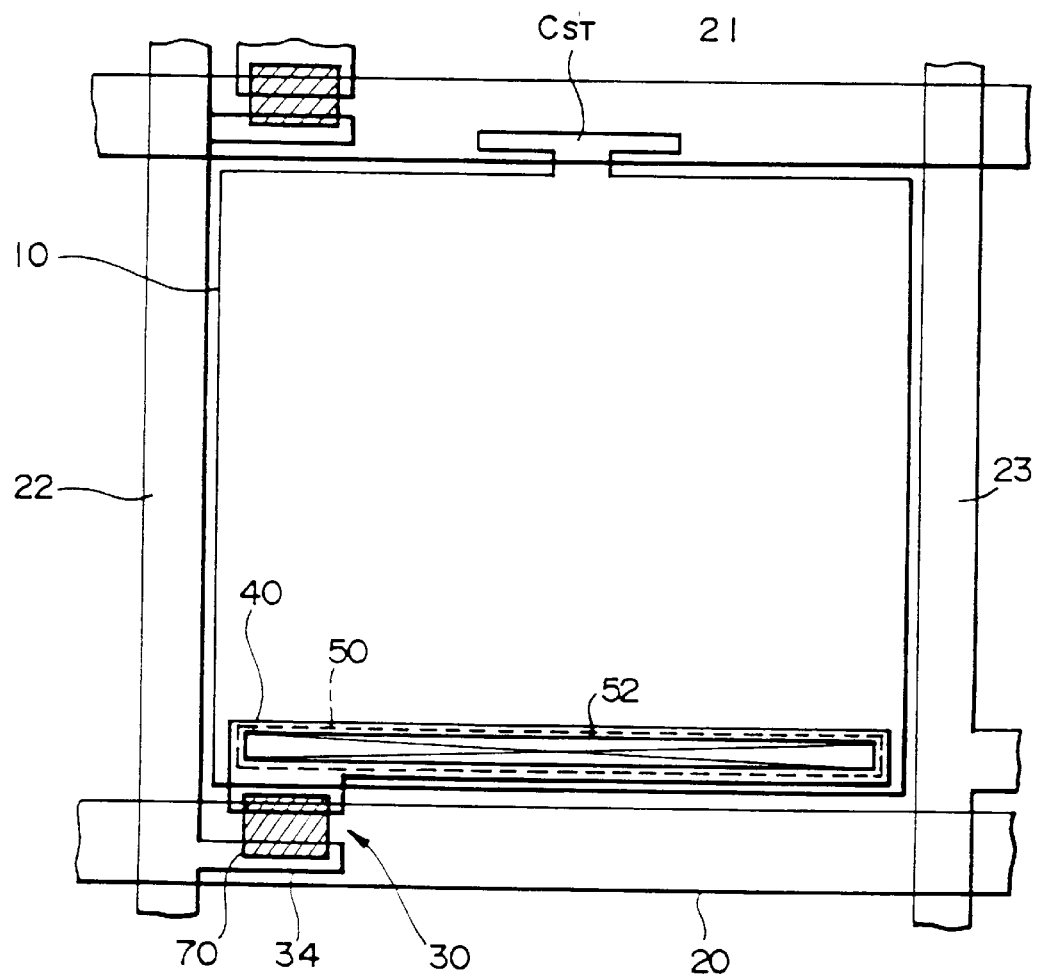
FIG. 5 shows another planar structure in accordance with Embodiment 1 of the invention.

Furthermore, the position of placement of TFT 30 is optional. For example, TFT 30 may be placed in a position as shown in FIG. 5. In FIG. 5, scan line 20 is below intrinsic silicon film 70 and becomes a gate electrode. Also, in the case of FIG. 5 contact region 50 is provided in the entire region of the pixel electrode edge region.

Figure 6:
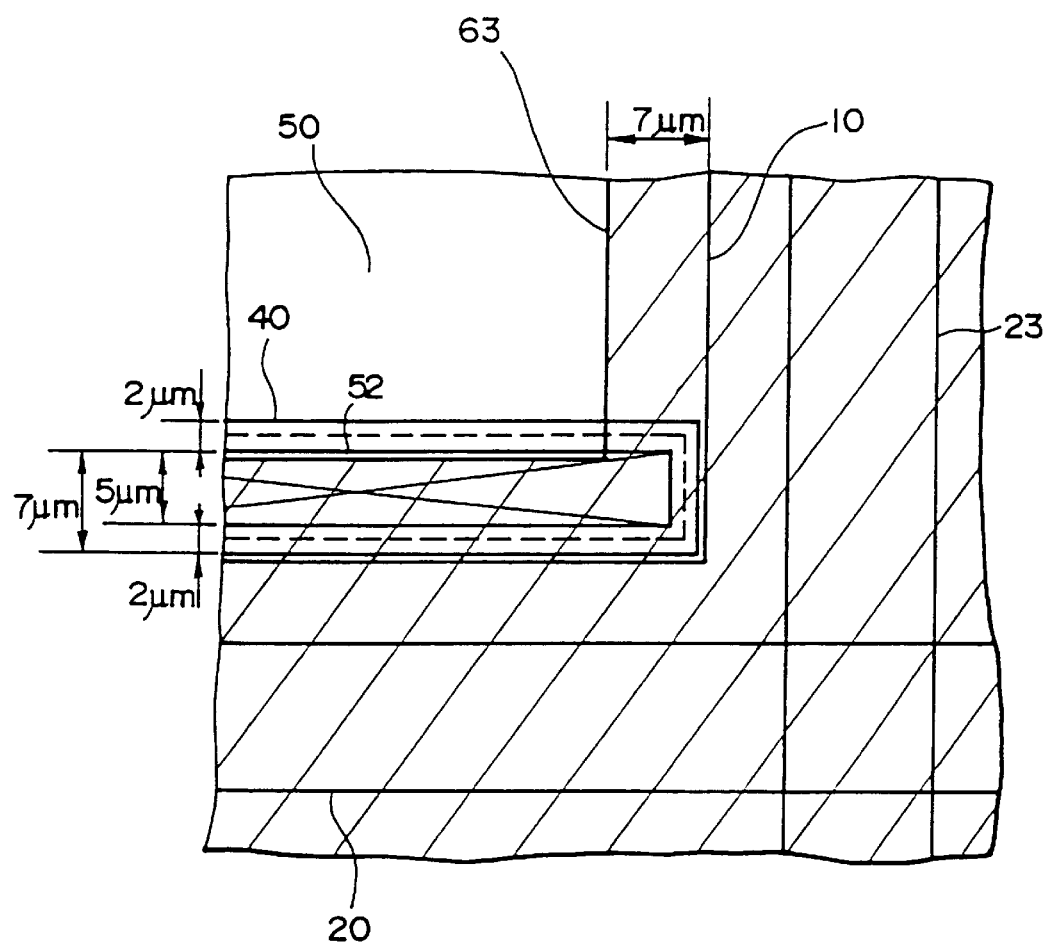
FIG. 6 shows the relationship of the black matrix.

In accordance with this embodiment, the formation of bad contacts can be reduced substantially without sacrificing aperture, as shown in FIG. 6. A liquid crystal display device usually is provided with a light-shielding layer, i.e., a black matrix. A color liquid crystal display device is provided with a color filter on top of this.

In order to ensurely prevent light leakage, black matrix 63 must be provided such that it overlaps inside pixel electrode 10, as shown in FIG. 6. In FIG. 6, for example, the value of that overlap is 7 $\mu$m. When black matrix 63 is provided on the opposing substrate, for example, because the combined spatial allowance for the opposing substrate and the TFT-side substrate and the combined spatial allowance for pixel electrode 10 itself must be considered, this overlap value becomes rather large. A certain overlap value becomes necessary even when black matrix 63 is provided on the TFT-side substrate. When the size of contact hole 52 is 5 $\mu$m, and the overlap of source electrode 40 in relation to contact hole 52 is 2 $\mu$m, the edge of black matrix 63 and the edge of contact hole 52 substantially correspond to each other, as shown in FIG. 6. When source electrode 40 is formed of a non-transparent material, the section of source electrode 40 does not contribute to the display in a transmissive liquid crystal display device. Nevertheless, because the positional relationships of contact region 50 and black matrix 63 are as shown in FIG. 6, the region that does not contribute to the display being newly produced by the formation of contact region 50 becomes extremely narrow, e.g., 2 $\mu$m wide. In other words, in accordance with this embodiment, it becomes possible to reduce effectively the formation of bad contacts substantially without sacrificing aperture by forming contact 50 in the region covered by black matrix 63.

Japanese Laid-Open Patent No. 4-155316 discloses a structure having a plurality of contact holes ("contact holes A") connecting pixel electrodes and storage capacitance electrodes. Nevertheless, these contact holes A are similar to contact holes 13 of FIG. 2A, and are completely different from contact holes 52 of this embodiment, which connect pixel electrodes and source electrodes.

Figure 10A:
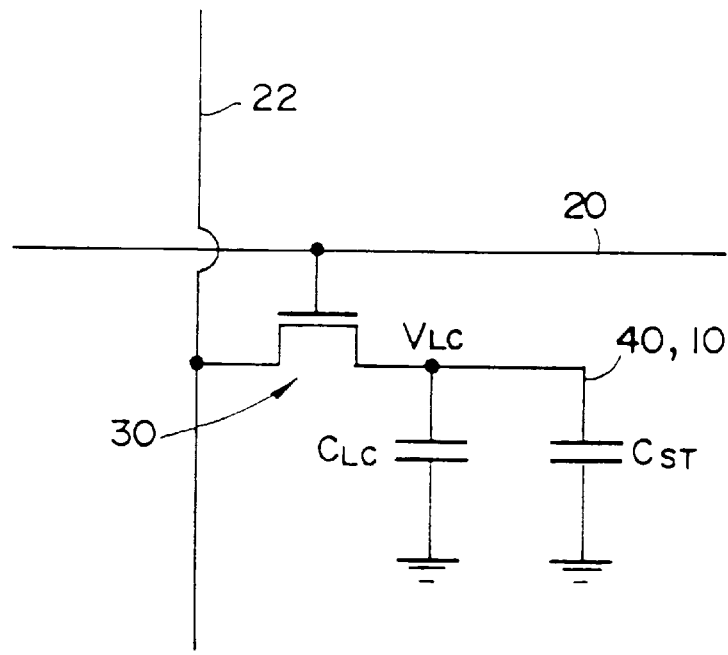
FIGS. 10A and 10B are circuit diagrams in accordance with Embodiment 2 of the invention.
Figure 10B:
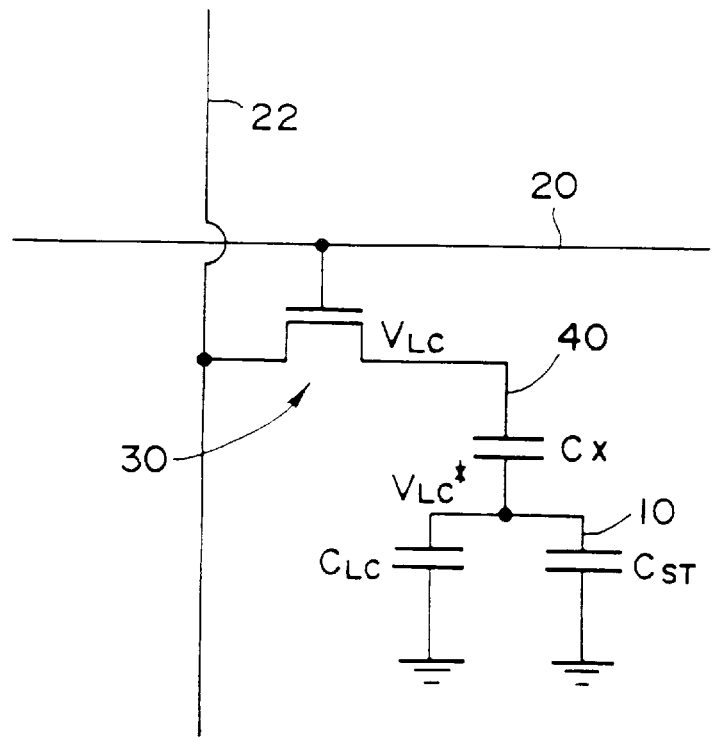

Also, Japanese Laid-Open Patent No. 4-155316 discloses providing multiple contact holes A for the purpose of increasing redundancy, such that the storage capacitance increases minimally, even when a bad contact occurs. Also, the multiple contact holes A substantially do not influence the operation of the liquid crystal display device. Consequently, the actual number of contact holes A does not need to be as much as shown in Japanese Laid-Open Patent No. 4-155316. Alternatively, a bad contact occurring in contact hole 52 of FIG. 1A, is linked to bad operation as shown in FIGS. 10A–10B, as described below. In this embodiment, the surface area of contact holes 52 is large and the number of holes is numerous in order to avoid such bad operation. Also, the embodiment is entirely different from the disclosure of Japanese Laid-Open Patent No. 4-155316 in the purpose and background.

An example of the manufacturing process of a liquid crystal display device of this embodiment is explained below using the cross-sectional views shown in FIGS. 7A–7F.

Details of Each Manufacturing Process

Process 1

Figure 7A:
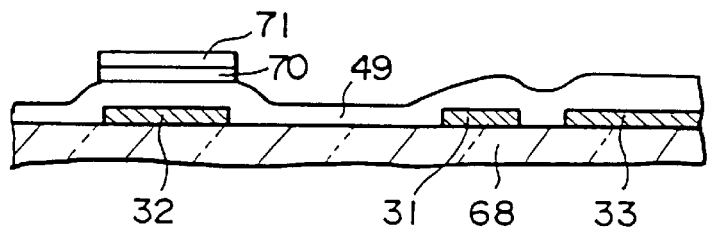
FIGS. 7A–7F are sectional views showing a method of manufacturing a planar structure in accordance with Embodiment 1 of the invention.

Using photolithography technology on a glass substrate, i.e., non-alkali substrate 68 shown in FIG. 7A, a gate electrode 32 is formed which is about 1300 angstrom thick Cr ("chrome"), for example, and an electrodes 31 and 33 made of the same material as the gate electrode. Next, a gate insulation film 49 made of a silicon nitride ("$SiN_X$") film, or the like, an intrinsic silicon film 70, and a n-type silicon film ("ohmic contact layer") 71 are formed successively by plasma CVD. Next, intrinsic silicon film 70 which is not doped with impurities and n-type silicon film ("ohmic contact layer") 71 are formed into islands using photoetching.

In this case, the thickness of gate insulation film 49 can be, for example, about 3000 angstroms, the thickness of intrinsic silicon film 70 can be, for example, about 3000 angstroms, and the thickness of ohmic contact layer 71 can be, for example, about 500 angstroms.

The characteristic of this process is that the contact holes are not formed in relation to the gate insulation film.

Process 2

Figure 7B:
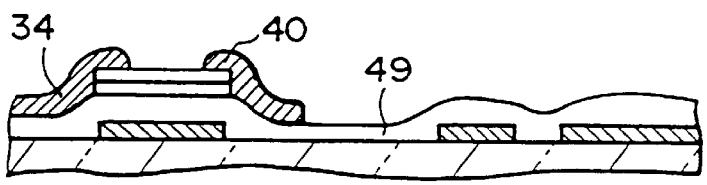

Next, a drain electrode 34 and source electrode 40 made of Cr ("chrome") extending 1300 angstroms are formed by sputtering and photoetching, for example, as shown in FIG. 7B.

Process 3

Figure 7C:
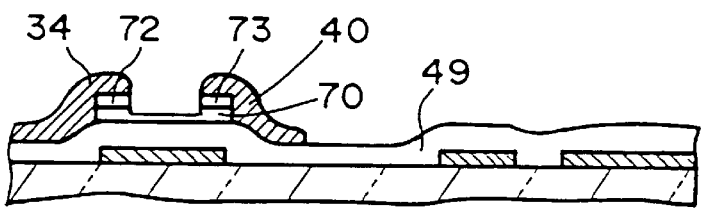

Next, as shown in FIG. 7C, drain/source separation is performed ("separation etching") by etching and eliminating the center of the ohmic contact layer 71 using drain electrode 34 and source electrode 40 as masks. In this case, the etching for patterning the drain electrode and source electrode and the separation etching can be performed successively in the same chamber of the same etching apparatus.

That is, drain electrode 34 and source electrode 40 are first etched with a $Cl_2$ system gas, and then the center of ohmic contact layer 71 is etched by switching the etching gas to a $SF_6$ system gas.

Process 4

Figure 7D:
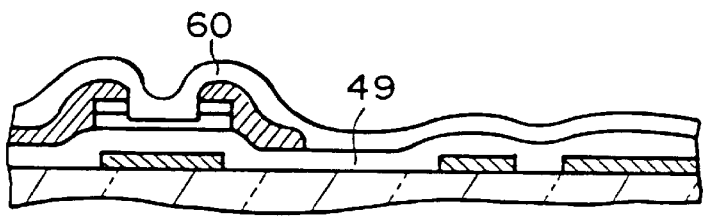

Next, as shown in FIG. 7D, a protective insulation film 60 is formed, for example, by a plasma CVD. This protective insulation film 60 may be, for example, a silicon nitride film ("$S_iN_x$") to the extent of 2000 A.

Process 5

Figure 7E:
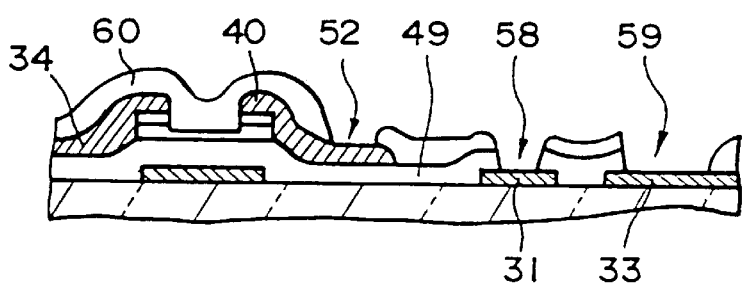

Next, as shown in FIG. 7E, a contact hole ("aperture") 59 is formed for connecting an external terminal, i.e., bonding wire, outer lead of IC, or similar device, to a portion of protective insulation film 60. At the same time, contact holes 52 and 58 are formed. Contact hole 52 connects source electrode 40 and pixel electrode 10. Also, contact hole 59 interconnects electrode 31 formed in the same process with the gate electrode and the pixel electrode. This hole is necessary for forming a protective diode, or similar device. Furthermore, contact hole 58 is necessary for forming an external terminal or test terminal.

Contact holes 58 and 59 are formed by piercing the overlapping films of gate insulation film 49 and protective insulation film 60. Contact hole 52 is formed by piercing only protective insulation film 60.

When forming contact holes 58 and 59, electrodes 31 and 33 each operate as etching stoppers. Also, when forming contact hole 52, source electrode 40 operates as an etching stopper.

Process 6

Figure 7F:
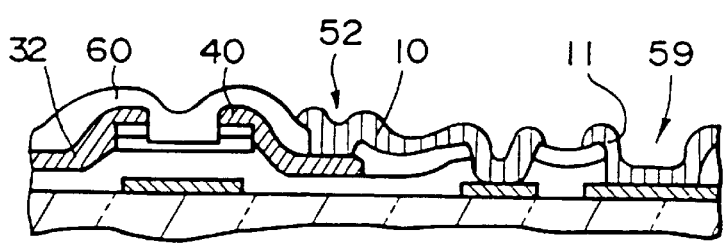

Next, as shown in FIG. 7F, pixel electrode 10 and electrode 11 are formed from ITO ("Indium Tin Oxide") by depositing an ITO film to a thickness of as much as 500 angstroms, and etching it selectively. The etching of the ITO is performed by wet etching using a mixture of $Hcl/HNO_3/H_2O$.

As described above, contact holes 58 and 59 are formed by piercing the overlapping films of gate insulation film 49 and protective insulation film 60. Consequently, contact holes 58 and 59 define a deep contact hole equivalent to the thickness of two layers of insulation films.

However, because ITO has a high melting point, its step coverage is better than aluminum. Consequently, it does not create a bad connection even when extending through a deep contact hole. Other transparent electrode materials having a high melting point, such as a metal oxide, can be used instead of ITO. For example, oxide films such as $SNO_X$, $ZNO_X$, and similar materials, can be used. In these cases, the step coverage can stand up to practical use.

A TFT manufactured in such a manner can be used as a switching element of a pixel region in an active matrix substrate. Also, an electrode 11 which is formed of ITO can become a pad for connecting an external terminal, i.e., outer lead of IC, or similar device.

Characteristics of the Present Manufacturing Method

FIGS. 8A–8G show an alternative method of manufacturing a TFT. This alternative method was conceived by the present inventors in order to make clear the characteristics of the TFT manufacturing method of this embodiment.

Figure 8A:
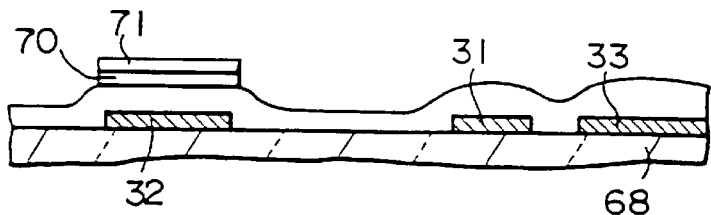
FIGS. 8A–8G are sectional views showing another method of manufacturing a planar structure.

FIG. 8A of the alternative example is the same as FIG. 7A. In FIGS. 8A–8G, the same elements have the same reference numbers as in FIGS. 7A–7F.

Figure 8B:

In the alternative example, contact holes K1 and K2 are formed before drain electrode 34 and source electrode 40 are formed, as shown in FIG. 8B.

Figure 8C:
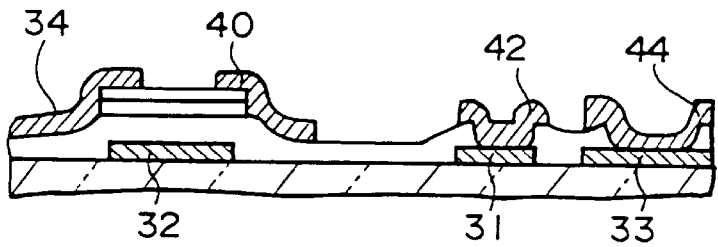

Also, electrodes 42 and 44 are formed along with drain electrode 34 and source electrode 40, which are composed of the same material, as shown in FIG. 8C.

Figure 8D:
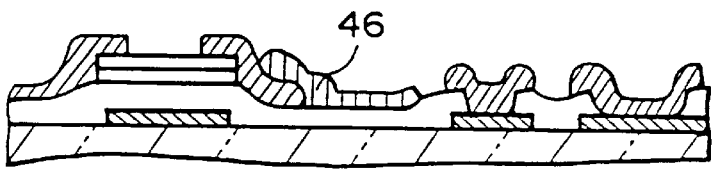

Next, pixel electrode 46 is formed with ITO, as shown in FIG. 8D.

Figure 8E:
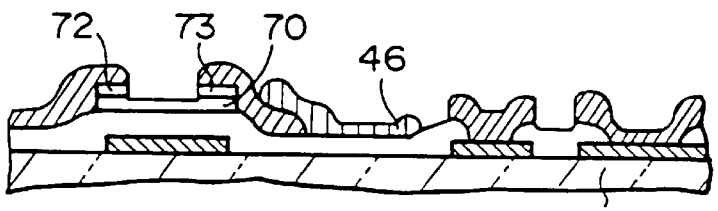

Next, etching, i.e., separation etching, of the middle section of ohmic contact layer 71 is performed, as shown in FIG. 8E.

Figure 8F:
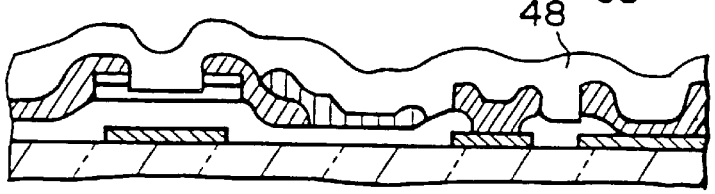

Next, protective insulation film 48 is formed, as shown in FIG. 8F.

Figure 8G:
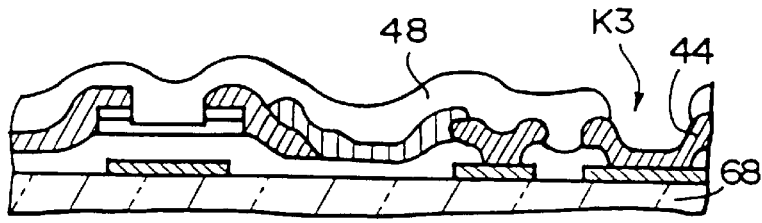

Finally, contact hole K3 is formed, as shown in FIG. 8G. Thus the surface of electrode 44 is exposed, and a pad is formed for connecting an external connection terminal.

In accordance with the manufacturing method of the alternative example, an additional process for forming contact hole K3 in FIG. 8G is added to the process that forms contact holes K1 and K2 in FIG. 8B. In total, two contact hole formation processes are required.

Alternatively, in the manufacturing method of this embodiment, contact holes 52, 58, and 59 are formed in one batch as shown in FIG. 7E. In other words, one contact hole formation process is sufficient by patterning protective insulation film 60 on source electrode 40 concurrently with the formation of contact holes by piercing the overlapping films of protective insulation film 60 and gate insulation film 49. Consequently, the light exposure process is curtailed via one process. Concomitant with this, a photoresist deposition process and its etching process are obviated. Consequently, the method is shortened by three processes. In other words, the manufacturing process is simplified.

Also, in accordance with the manufacturing process of this embodiment, patterning ("dry etching") of drain electrode 34 and source electrode 40 shown in FIG. 7B and etching ("dry etching") of the center of ohmic contact layer 71 shown in FIG. 7C are performed successively in the same chamber. In other words, consecutive etching is possible by switching the etching gas sequentially in the same chamber.

However, in the case of the alternative example, after patterning ("dry etching") of drain electrode 34 and source electrode 40 in FIG. 8C, wet etching of pixel electrode 46 which is made of ITO of FIG. 8D is performed. Next, etching ("dry etching") of the center of ohmic contact layer 71 of FIG. 8E is performed. Because ITO cannot be processed by dry etching, and can only be processed by wet etching, each etching process of FIGS. 8C–8E cannot be performed consecutively in one chamber. Consequently, the substrate must be handled in each process, and the work is troublesome.

Also, in the case of this embodiment, a protective insulation film 60 must be placed between pixel electrode 10 and electrode 11 made of ITO, and drain electrode 34 and source electrode 40. Thus, electrodes composed of ITO and electrodes composed of the same material as the drain electrode and the source electrode assuredly can be separated electrically in the other regions (not shown) on the substrate.

However, in the alternative example, electrode 46 and drain electrode 34 and source electrode 40 belong to the same layer, and a protective insulation film cannot be placed between them. Consequently, if a extraneous material is present in another region (not shown) on the substrate, there is a concern that the electrodes composed of ITO and the electrodes composed of the same material as the drain electrode and the source electrode may short, despite the fact that they must be insulated naturally. In other words, the device formed by the manufacturing method of this embodiment is highly reliable.

Also, in the alternative example, because electrode 46 composed of ITO is formed at a comparatively early stage as shown in FIG. 8D, contamination may occur in subsequent processing by indium ("In") and tin ("Sn"), which are constituents of ITO.

However, in the manufacturing method of this embodiment, because electrode 10 and electrode 11, composed of ITO, are formed at the final stage, there is no problem of contamination by tin ("Sn"), and similar materials, which are the constituents of ITO.

Thus, in accordance with the manufacturing method of this embodiment, the manufacturing processes can be reduced, and a highly reliable device can be manufactured.

Figure 9A:
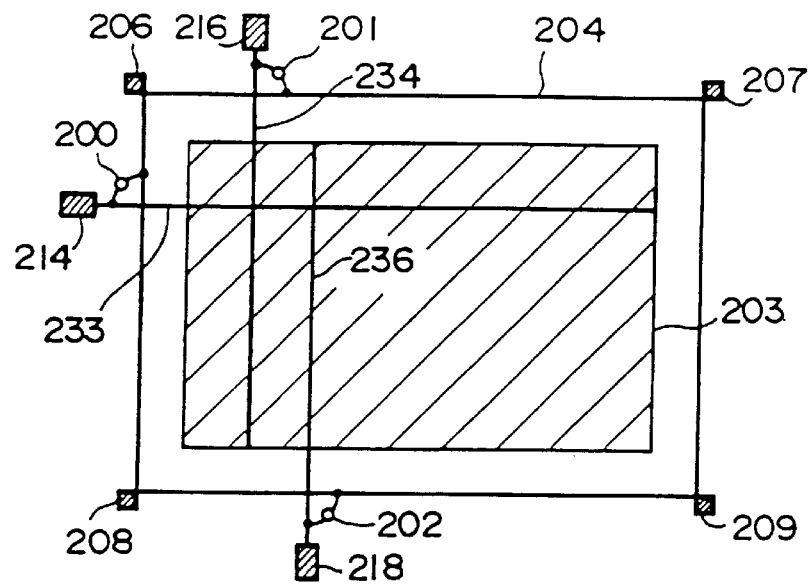
FIGS. 9A–9C show a protection diode.
Figure 9B:
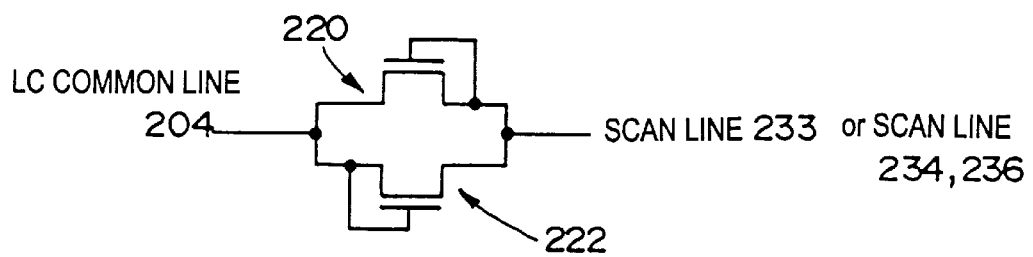
Figure 9C:
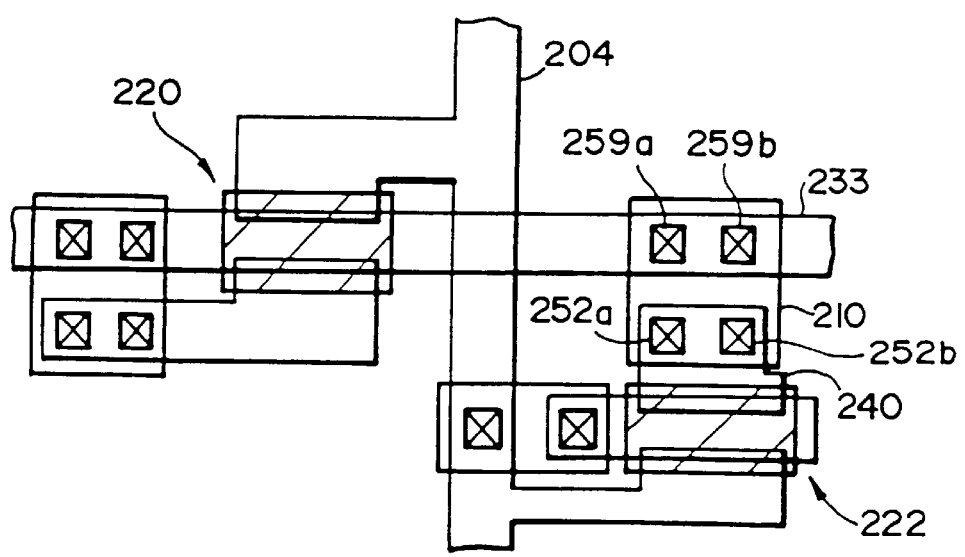

Next, protective diodes used in this embodiment are shown in FIGS. 9A–9C. As shown in FIG. 9A, protective diodes 200, 201, and 202 are provided in order to protect the TFTs, and similar devices, connected to scan line 233 and signal line 234 and 236, from external static electricity. Also, as shown in FIG. 9A, protective diodes 200, 201 and 202 are formed in the region of outside of display region 203. More specifically, protective diode 200 allows the static electricity added to scan line 233 from pad 214 to escape to LC common line 204, and protective diodes 201 and 202 allow the static electricity added to signal lines 234 and 236 from pads 216 and 218 to escape to LC common line 204. LC common line 204 is connected to an external driver IC in addition to being connected to the opposing electrode via silver point pads 206–209.

FIG. 9B is an example of an equivalent circuit drawing of protective diodes 200–203. These protective diodes, as shown in FIG. 9B, include TFTs 220 and 222 which have a gate electrode connected to a drain electrode, and operate as elements having a non-linear impedance in relation to the source/drain voltage, i.e., they have high impedance when low voltage is applied, and they have low impedance when high voltage is applied.

FIG. 9C is an plane view (layout) of protective diode 200 in accordance with this embodiment. The main characteristic of this protective diode is that source electrode 240 of TFT 222 is connected to scan line 233 via contact holes 252a,b, electrode 210, formed of the same material as the pixel electrode, and contact holes 259a–b. Contact holes 252a–b are equivalent to contact hole 52 of FIG. 7F, electrode 210 corresponds to pixel electrode 10, contact holes 259a–b correspond to contact hole 59, and scan electrode 233 corresponds to electrode 33. In short, in order to form the protective diodes of this embodiment, it is necessary to connect source electrode 240 and scan electrode 233.

In this embodiment as shown in FIG. 7A, a contact hole for gate insulation film 49 is not formed in order to reduce the number of formation processes of the contact hole. Consequently, source electrode 240 cannot be connected directly to scan line 233 via a contact hole in the gate insulation film. Thus, in this embodiment, after the gate insulation film and the protective insulation film are formed source electrode 240 is connected to scan electrode 233 by simultaneously opening contact holes 252a–b and 259a–b, and by using electrode 210 deposited thereafter.

Electrode 210 is formed of ITO, or similar device, which is the same material as the pixel electrode. Also, ITO is better in step coverage, and similar characteristics, compared with aluminum because it has a high melting point. In addition, because ITO is formed by reaction sputtering, or similar processes, the solid angle can be increased substantially, and the step coverage can be made to be even better than chrome, and similar materials. Consequently, if an ITO is used such as the one of this embodiment, it is possible to make a good interelectrode connection even through a deep contact hole, such as when both the gate insulation film and the protective insulation film are pierced.

Embodiment 2

Embodiment 2 eliminates a pixel defect apparently even when a bad contact has formed between source electrode and pixel electrode by changing this into a bad tone shift, or similar characteristics.

First, the principles are explained using FIGS. 10A–10B. FIG. 10A is a circuit drawing of a liquid crystal display device when no bad contacts exist between source electrode 40 and pixel electrode 10. FIG. 10B is a circuit drawing when a bad contact does exist. When no bad contacts exist as shown in FIG. 10A, a liquid crystal capacitor $C_{LC}$ and a storage capacitor $C_{ST}$, having an opposing electrode ("LC common line") as the other electrode, are connected to source electrode 40 and pixel electrode 10 of TFT 30. Alternatively, when a bad contact does exist as shown in FIG. 10B, a given parasitic capacitance $C_X$ is formed between source electrode 40 and pixel electrode 10. When such a parasitic capacitance $C_X$ is formed, the voltage applied to the liquid crystal, i.e., liquid crystal applied voltage is reduced from $V_{LC}$ to $V_{LC}*$, and a pixel defect is caused by this, such as a white defect by a black display pixel turning to a white display.

The relationship between the voltage $V_{LC}*$ and $V_{LC}$ applied to the liquid crystal with a bad contact is:

$$V_{LC}* = \{C_X/C_0(V_{LC}*)+C_X)\} \times V_{LC} \qquad (1)$$

as is clearly shown in FIG. 10B.

Here, $C_0(V_{LC}*)=C_{LC}(V_{LC}*)+C_{ST}$, and $C_0(V_{LC}*)$ changes according to the value of $V_{LC}*$. In the case of a structure not providing a storage capacitor, $C_0(V_{LC}*)=C_{LC}(V_{LC}*)$. Also, even when a storage capacitor is formed, there are many types of storage capacitors. For example, a storage capacitor may be formed between pixel electrode 10 or electrode 15 and the neighboring scan line 21, as shown in FIGS. 1A–2B, and a storage capacitor may be formed between pixel electrode 10 and a given electrode for storage capacitance.

In this embodiment, the procedure described below is applied in order to prevent the generation of pixel defects due to the reduction of $V_{LC}$ as shown in Equation (1). That is, first, if $V_{LCMIN}$ is the voltage when the transmissivity in the pixel location is the minimum transmissivity, $V_{LCMAX}$ is the voltage when it is the maximum transmissivity, $C_{0MAX}$ is the maximum value of pixel capacitance $C_0$ (in case of black display, or the like), and $C_{0MIN}$ is the minimum value, the capacitance ratio $RA_{C1}$ is set such that the following relationship is established:

$$RA_{C1}=C_X/C_{0MAX}>V_{LCMAX}/(V_{LCMIN}-V_{LCMAX}) \qquad (2)$$

Figure 11A:
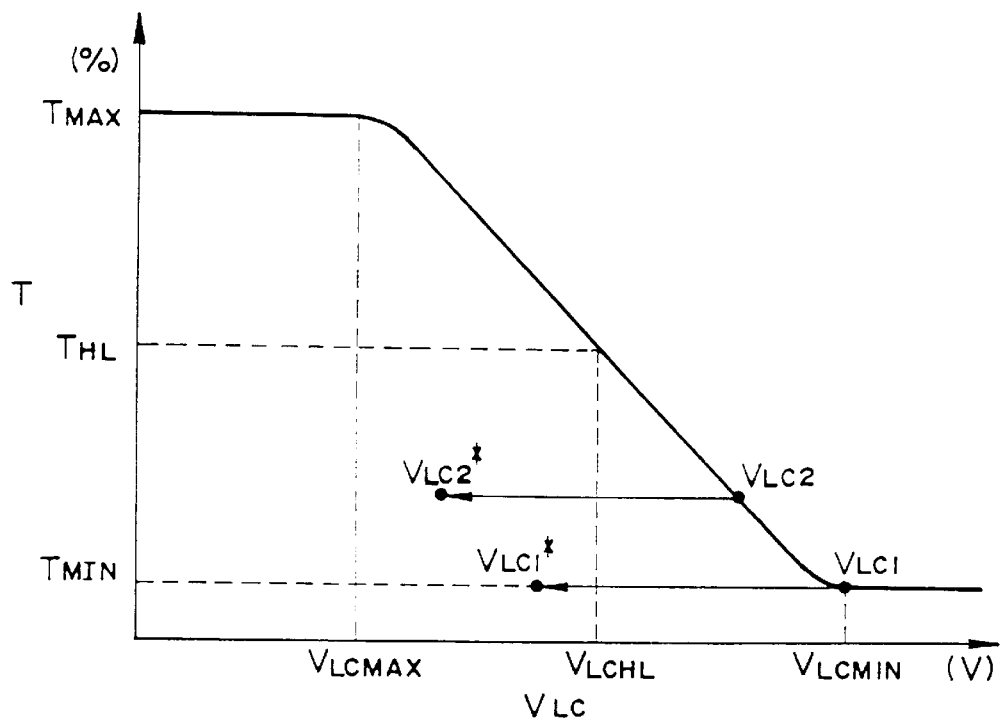
FIGS. 11A and 11B show the relationship between the voltage $V_{LC}$ and the transmissivity T when normally-white and normally-black.

As is clear from Equations (1) and (2), if the relationship of Equation (2) is established, the relationship:

$$V_{LC}^* = \{C_X / (C_0(V_{LC}^*) + C_X)\} \times V_{LC} \qquad (3)$$
$$> \{C_X / (C_{0MAX} + C_X)\} \times V_{LC}$$
$$> \{V_{LCMAX} / V_{LCMIN}\} \times VLC$$

is established. For example, FIG. 11A shows one example of the relationship between voltage $V_{LC}$ and transmissivity T of a liquid crystal display device of a normally-white method. According to this embodiment, the voltage $V_{LC1}$ ($V_{LCMIN}$) of the pixel, for example, where the transmissivity is the minimum transmissivity, that is, black display, changes to $V_{LC1}^*$. This $V_{LC1}^*$ is greater than $V_{LCMAX}$, as shown in FIG. 11A, and consequently, this pixel does not become a white display, rather it becomes a gray display. If it is a gray display, the human eye substantially does not notice it. As a result, according to this embodiment, a pixel defect can be eliminated apparently. The above fact is clear also from the fact that, when $V_{LC}^*=V_{LC1}^*$ and $V_{LC}=V_{LC1}=V_{LCMIN}$, $$V_{LC1}>V_{LCMAX}. \qquad (4)$$

However, as shown in FIG. 11A, even for a pixel not of black display, where the voltage is $V_{LC2}$, the voltage $V_{LC2}$ only changes to $V_{LC2}^*$, and only the display tone is shifted. Consequently, a pixel defect can be apparently eliminated even for such a pixel.

According to this embodiment, by setting the capacitance ratio $RA_{C1}$ such that Equation (2) is satisfied, at least the pixels of a black display can be prevented from turning into a white display. Thus, when a bad contact has formed, the condition whereby that pixel appears clearly as a pixel defect is prevented. Nevertheless, in order to apparently eliminate this pixel defect, it is desirable to set the capacitance ratio $RA_{C1}$ to be even larger. For example, if $V_{LCHL}$ is the voltage when the transmissivity in the pixel location is approximately 50% of the maximum transmissivity $T_{MAX}$, it is desirable to set the capacitance ration $RA_{C1}$ such that it becomes:

$$RA_{C1}=C_X/C_{0MAX}>V_{LCHL}/(V_{LCMIN}-V_{LCHL}). \qquad (5)$$

By setting in this manner, as is clear from Equation (1) and Equation (5):

$$V_{LC}^* = \{C_X / (C_0(V_{LC}^*) + C_X)\} \times V_{LC} \qquad (6)$$
$$> \{C_X / (C_{0MAX} + C_X)\} \times V_{LC}$$
$$> \{V_{LCHL} / V_{LCMIN}\} \times V_{LC}.$$

Consequently, as is clear from Equation (6), according to this invention, the transmissivity of a black pixel ($V_{LC}=V_{LC1}=V_{LCMIN}$) can be less than or equal to $T_{HL}$, which is approximately 50% of $T_{MAX}$. If the transmissivity is less than or equal to $T_{HL}$, the human eye sees almost no distinction from a black display. Consequently, the display is unnoticeable to the human eye if great attention is not paid.

Furthermore, it is preferable to set the capacitance ratio such that the transmissivity during a black display becomes less than or equal to approximately 10% of $T_{MAX}$. Thus, a display can be made whereby the pixel defect is substantially unnoticeable to the human eye. Nevertheless, there may be cases where the capacitance ratio cannot be made so large from the relationships with the aperture, and the like. In such a case, the capacitance ratio may be set such that the transmissivity during a black display becomes approximately 50%–90% of $T_{MAX}$. If the transmissivity is in the range of approximately 50%–90% of $T_{MAX}$, the pixel defect is more easily noticed by the human eye, but an effect can be achieved such as correcting the pixel defect to a tone shift.

If the relationship of Equation (2) is established, even though a bad contact occurs, and the voltage applied to a black display pixel ($V_{LC}=V_{LC1}=V_{LCMIN}$) is reduced to $V_{LC1}^*$, the voltage $V_{LC1}^*$ assuredly can be made to be greater than $V_{LCMAX}$, as is clear from Equation (4).

However, in place of Equation (2), even when the capacitance ratio $RA_{C2}$ is set such that the relationship:

$$RA_{C2}=C_X/C_{0MIN}>V_{LCMAX}/(V_{LCMIN}-V_{LCMAX}) \qquad (7)$$

is established, a black display pixel can be prevented from becoming a white display.

In other words, if Equation (7) is established, $$\{C_X/(C_{0MIN}+C_X)\}\times V_{LC}>\{V_{LCMAX}/V_{LCMIN}\}\times V_{LC} \qquad (8)$$

Meanwhile, the pixel capacitance $C_0(V_{LC}^*)$ is a function of the above-mentioned $V_{LC}^*$, and because $C_0(V_{LC}^*)$ is greater than $C_{0MIN}$:

$$\{C_X/(C_{0MIN}+C_X)\}\times V_{LC}>\{C_X/C_0(V_{LC}^*)+C_X)\}\times V_{LC} \qquad (9)$$

Consequently, according to the value of the pixel capacitance $C_0(V_{LC}^*)$, there are cases whereby:

$$V_{LC}^*=\{C_X/(C_0(V_{LC}^*)+C_X)\}\times V_{LC}>\{V_{LCMAX}/V_{LCMIN}\}\times V_{LC} \qquad (10)$$

If Equation (10) is established, $V_{LC}^*=V_{LC1}^*$, and when $V_{LC}=V_{LC1}=V_{LCMIN}$, the relationship:

$$V_{LC1}^*>V_{LCMAX} \qquad (11)$$

is established, and a black display pixel is prevented from becoming a white display.

For example, since $V_{LCMIN}=5V$, $V_{LCMAX}=1V$, $C_{0MAX}=140$ fF (black display), and $C_{0MIN}=80$ fF (white display) when these values are inserted into Equation (2):

$$C_X > C_{0MAX} \times \{V_{LCMAX}/V_{LCMIN} - V_{LCMAX})\} = 140 \times \quad (12)$$
$$\{1/(5-1)\}$$
$$= 35 \text{ fF}.$$

Consequently, if $C_X$ is greater than 35 fF, a black display pixel can be assuredly prevented from becoming a white display.

However, if the above values are inserted into Equation (7):

$$C_X > C_{0MIN} \times \{V_{LCMAX}/V_{LCMIN} - V_{LCMAX})\} = 80 \times \quad (13)$$
$$\{1/(5-1)\}$$
$$= 20 \text{ fF}.$$

Thus, 30 fF is selected as the $C_X$ that satisfies Equation (13). The $C_X$ is less than 35 fF and does not satisfy Equation (12). However, according to the value of $C_0(V_{LC}*)$ during reduction of voltage $V_{LC}*$, a black display pixel may be prevented from becoming a white display. That is, if the case is considered where the $C_0(V_{LC}*)$ of a black display pixel is reduced from 140 fF to 90 fF due to the reduction of $V_{LC}*$, from Equation (1):

$$V_{LC}^* = \{C_X/(C_0(V_{LC}^*) + C_X)\} \times V_{LC} \quad (14)$$
$$= \{30/(90+30)\} \times V_{LC}$$
$$= 0.25 \times V_{LC}.$$

Consequently, the voltage of a black display pixel may be reduced from $V_{LC1}=V_{LC}=V_{LCMIN}=5V$ to $V_{LC1}*=V_{LC}*=1.25V$. However, because the relationship $V_{LC1}*=1.25V>V_{LCMAX}=1V$ is established, the black display pixel does not become a white display. Instead, it becomes a gray display. Thus, because there are cases when Equation (10) is established according to the value of $C_0(V_{LC}*)$, even when setting the capacitance ratio such that Equation (7) is established, a black display pixel can be prevented from becoming a white display.

Examples using the normally-white method have been mainly discussed above. However, in the case of a normally-black method as shown in FIG. 11B, the relationships of Equations (2), (5), and (7) become:

$$RA_{C1}=C_X/C_{0MAX}>V_{LCMIN}/(V_{LCMAX}-V_{LCMIN}) \quad (15)$$
$$RA_{C1}=C_X/C_{0MAX}>V_{LCHL}/(V_{LCMAX}-V_{LCMIN}) \quad (16)$$
$$RA_{C2}=C_X/C_{0MIN}>V_{LCMIN}/(V_{LCMAX}-V_{LCMIN}) \quad (17)$$

Figure 11B:
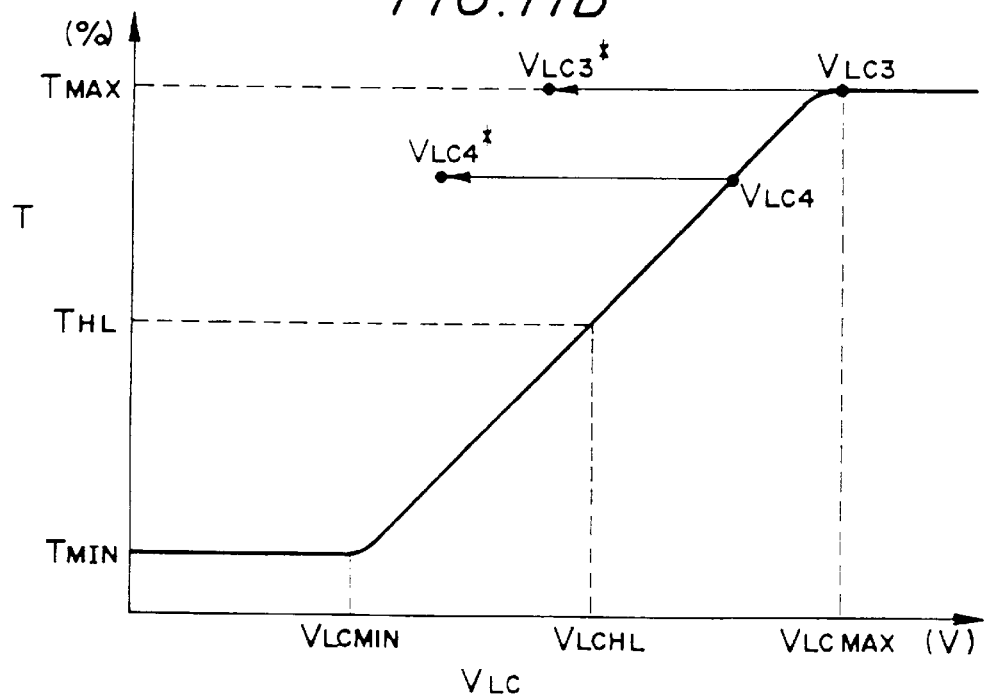

In a normally-black method as well, as shown in FIG. 11B, by the voltage of a white display pixel changing from $V_{LC3}$ to $V_{LC3}*$, the pixel can be made to be a gray display rather than a black display. Since the voltage of non-white pixels changes from $V_{LC4}$ to $V_{LC4}*$, a pixel defect can be changed into a tone shift, and degradation of the display characteristics can be prevented when a pixel defect exists.

Also, various methods of adjusting the capacitance ratios $RA_{C1}$ and $RA_{C2}$ can be considered. The first method is a method that adjusts the overlap surface area, or the like, between source electrode 40 and pixel electrode 10. That is, the capacitance ratio can be adjusted by adjusting the electrode surface area of the parasitic capacitor $C_X$. In this case, it is desirable to form the contact region as explained in Embodiment 1. That is, as explained in Embodiment 1, if the contact hole is rectangular, and the surface area of the contact region is larger, the formation of bad contacts can be reduced, and the capacitance ratio can be greater. Therefore, as is clear from Equation (3), the decrease of the voltage $V_{LC}$ when a bad contact exists can be smaller. Consequently, combining Embodiments 1 and 2 provides a mutually synergetic effect, and separate effects not achievable individually by Embodiments 1 and 2 can be achieved.

Also, the second method is a method of correcting the film thickness of the protective insulation film 60 interposed between source electrode 40 and pixel electrode 10. That is, the capacitance ratios $RA_{C1}$ and $RA_{C2}$ can be corrected by correcting the interelectrode distance of the parasitic capacitor $C_X$. This method, depending on the relationship with the aperture, and the like, is effective when the overlap surface area, and the like, of source electrode 40 and pixel electrode 10 cannot be adjusted so much. Various other methods of adjusting the capacitance ratio can be adopted, such as changing the material quality of protective insulation film 60, and adjusting the liquid crystal capacitance $C_{LC}$ and the storage capacitance $C_{ST}$.

Figure 12:
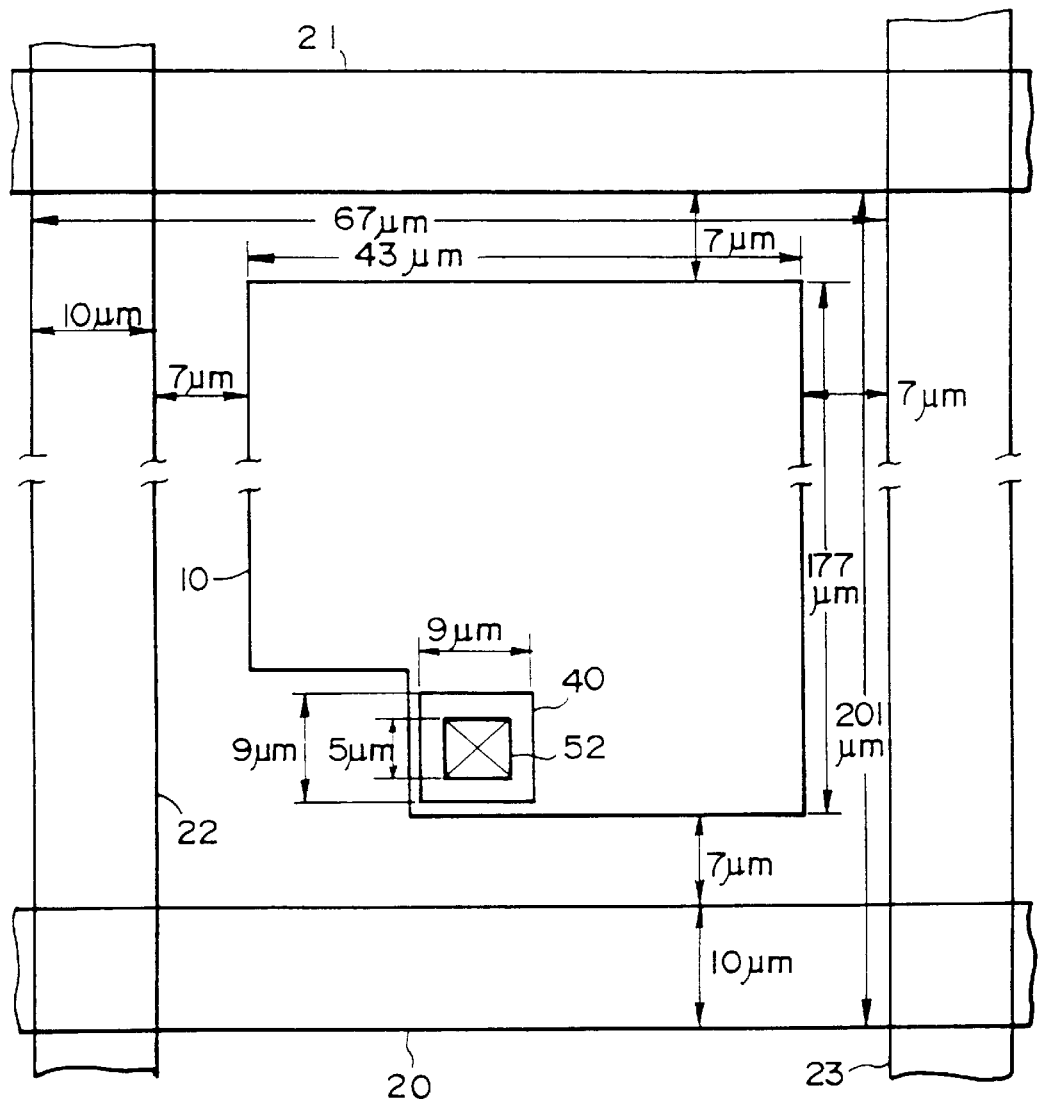
FIG. 12 shows a method of setting the capacitance ratio.
Figure 13:
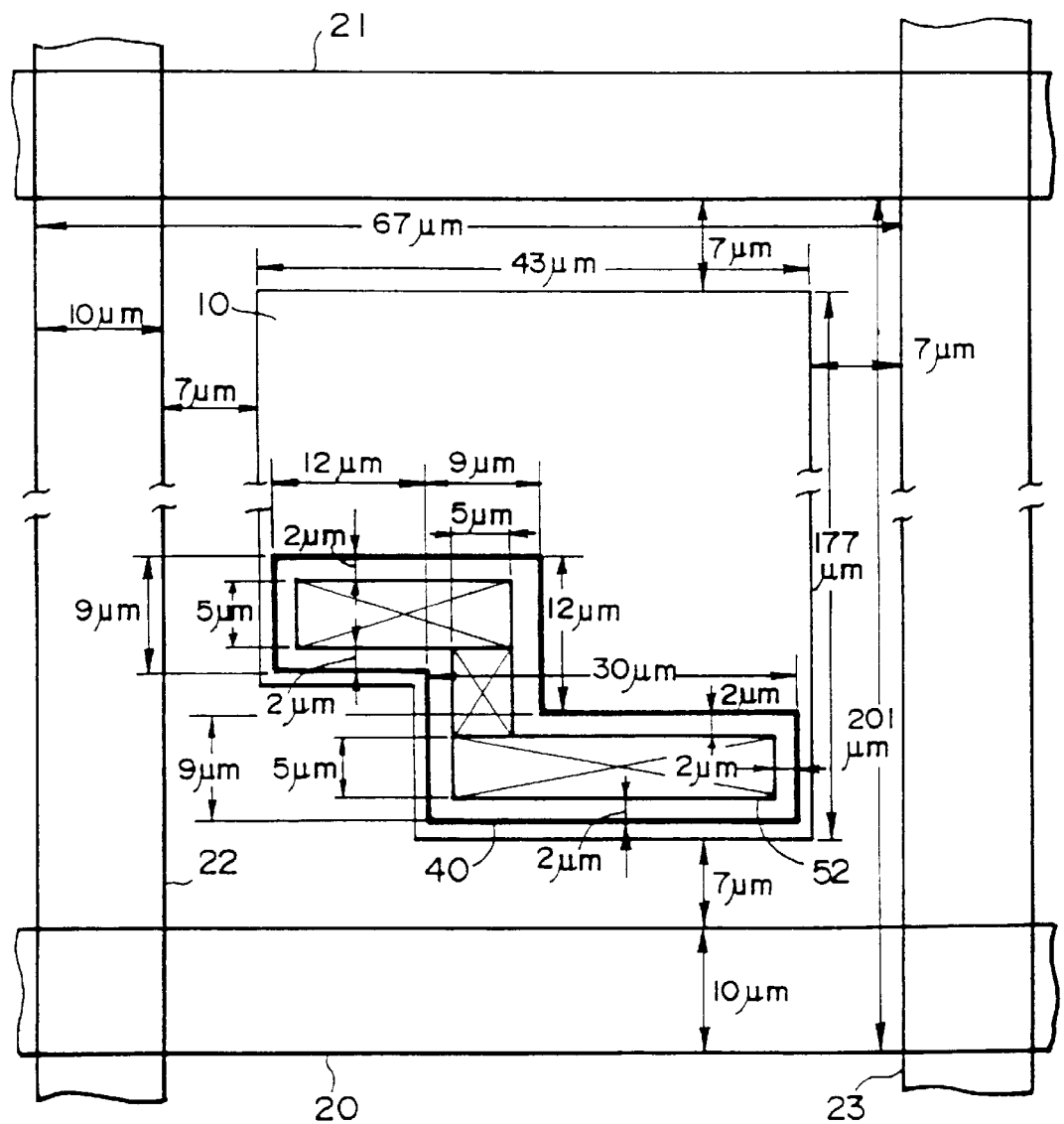
FIG. 13 shows a method of setting the capacitance ratio.

Lastly, examples of setting the capacitance ratio are shown in FIGS. 12–13.

Here, the liquid crystal panel is a 13-inch SXGA display. As shown in FIGS. 12–13, the pitch of pixel electrodes 10 is 201 $\mu$m vertically and 67 $\mu$m horizontally. Also, the distance between signal lines 22 and 23, and pixel electrodes 10, and the distance between scan lines 20 and 21, and pixel electrodes 10 are both 7 $\mu$m. Also, the widths of scan line 20 and signal line 22 are both 10 $\mu$m. Thus, the size of pixel electrodes 10 is 177 $\mu$m vertically and 43 $\mu$m horizontally. The liquid crystal capacitance $C_{LC}$ becomes:

$C_{LC}$=100 fF (black display)~50 fF (white display) Also, the storage capacitance $C_{ST}$ becomes:

$C_{ST}$=25 fF.

Thus, $C_0$=125 fF ($C_{0MAX}$)~75 fF ($C_{0MIN}$)

Also, the film thickness of the protective insulation film 60 that forms parasitic capacitor $C_X$ is 2000 Angstrom, and the specific inductive capacity is set to $\epsilon$=6.5. Furthermore, in a liquid crystal as shown in FIG. 11A, generally the voltage during minimum transmissivity is such that $T_{MIN}$ becomes approximately $V_{LCMIN}$=4.8V, for example, and the voltage during maximum transmissivity $T_{MAX}$ becomes approximately $V_{LCMAX}$=1.5V, for example.

In the case shown in FIG. 12, the size of contact 52 is smaller, i.e., both horizontally and vertically, and the size of source electrode 40 is 9 $\mu$m both horizontally and vertically. Consequently, the overlap surface area between pixel electrode 10 and source electrode 40 is 81 $\mu$m$^2$. Thus, the parasitic capacitance $C_X$ and the capacitance ratio $RA_{C1}$ are:

$$C_X = (6.5 \times 8.85 \times 10^{-12} \times 81 \times 10^{-12})/2000 \times 10^{-10}$$
$$= 23.3 \text{ fF}$$

-continued $$RA_{CI} = C_X / C_{0MAX}$$
$$= 23.3/125$$
$$= 0.19 < \{V_{LCMAX}/(V_{LCMIN} - V_{LCMAX})\} = 0.45$$

Here, the voltage of the black display pixels is $V_{LC}=V_{LC1}=V_{LCMIN}=4.8V$. Consequently, when the voltage of the black display pixels has a bad contact, as shown in Equation (1):

$$V_{LC}^* = \{C_X / (C_0(V_{LC}^*) + C_X)\} \times V_{LC} \quad (18)$$
$$= \{23.3/(C_0(V_{LC}^*) + 23.3)\} \times 4.8$$

In Equation (18), $V_{LC}^*$ to $C_0(V_{LC}^*)$ are in a recursive relationship. Thus, initially the $V_{LC}^*$ when $C_0(V_{LC}^*)=C_{0MAX}=125$ fF is sought. Doing thus:

$$V_{LC}^* = \{23.3/(125 + 23.3)\} \times 4.8$$
$$= 0.75 \text{ V}$$

In the above case, because $V_{LC}=0.75V<V_{LCMAX}=1.5V$, it is thought that the pixels form a white display, and $C_0(V_{LC}^*)$ is thought to be reduced to $C_{0MIN}=75$ fF. Thus, when $C_0(V_{LC}^*)=C_{0MIN}=75$ fF is inserted again into Equation (18):

$$V_{LC}^* = \{23.3/(75 + 23.3)\} \times 4.8$$
$$= 1.14 \text{ V}$$

Because $V_{LC}^*=0.14V<V_{LCMAX}=1.5$, as is clear from FIG. 11A, the black display pixels form a completely white display as expected, and the pixel defect is immediately recognizable to the human eye. That is, if contact hole 52 is made into a shape as shown in FIG. 12, and the capacitance ratio is set to $RA_{C1}=0.19$, it is impossible to eliminate the appearance of the pixel gap.

However, in the case shown in FIG. 13, contact hole 52 is shaped as shown in FIG. 4 of Embodiment 1, the total length is 50 μm, and the width is 5 μm. Also, because the overlap margin between source electrode 40 and contact 52 is 2 μm, the overlap surface area between pixel electrode 10 and source electrode 40 is 486 μm² (12×9+30×9). Consequently, the parasitic capacitance $C_X$ and the capacitance ratio $RA_{C1}$ in the case shown in FIG. 13 are:

$$C_X = (6.5 \times 8.85 \times 10^{-12} \times 486 \times 10^{-12})/2000 \times 10^{-10}$$
$$= 140 \text{ fF}$$

$$RA_{CI} = C_X / C_{0MAX}$$
$$= 140/125$$
$$= 1.12 > \{V_{LCMAX}/(V_{LCMIN} - V_{LCMAX})\} = 0.45$$

Also, the voltage of the black display pixels when a bad contact has formed becomes:

$$V_{LC}^* = \{C_X / (C_0(V_{LC}^*) + C_X)\} \times V_{LC} \quad (19)$$
$$= \{140/(C_0(V_{LC}^*) + 140)\} \times 4.8$$

In the same manner as the described above, initially the $V_{LC}^*$ when $C_0(V_{LC}^*)=C_{0MAX}=125$ fF is sought. Doing thus:

$$V_{LC}^* = \{140/125 + 140)\} \times 4.8$$
$$= 2.54 \text{ V}$$

In the above case, because $V_{LC}^*=2.54V<V_{LCMAX}=1.5$, it is thought that the black display pixels are intermediate between a white display and a black display, and $C_0(V_{LC}^*)$ is reduced to, for example, 100 fF ((125+75)/2). Thus, when $C_0(V_{LC}^*)=100$ fF is again inserted into Equation (19):

$$V_{LC}^* = \{140/125 + 140)\} \times 4.8$$
$$= 2.80 \text{ V}$$

Because $V_{LC}^*=2.80V>V_{LCMAX}=1.5V$, as is clear from FIG. 11a, the black display pixels form a gray display, and the pixel defect is apparently eliminated. That is, the pixel defect can be shown as a tone shift, and the display characteristics can be improved.

Because the above explanation is simplified, Equations (18) and (19) are solved and $V_{LC}^*$ is sought by simple methods using a simplified $C_0(V_{LC}^*)$. However, to perform a more reliable design, it is desirable to seek $V_{LC}^*$ more accurately by actually measuring the voltage dependencies of $C_0(V_{LC}^*)$ and by numerical simulation, and similar processes.

Embodiment 3

Figure 14:
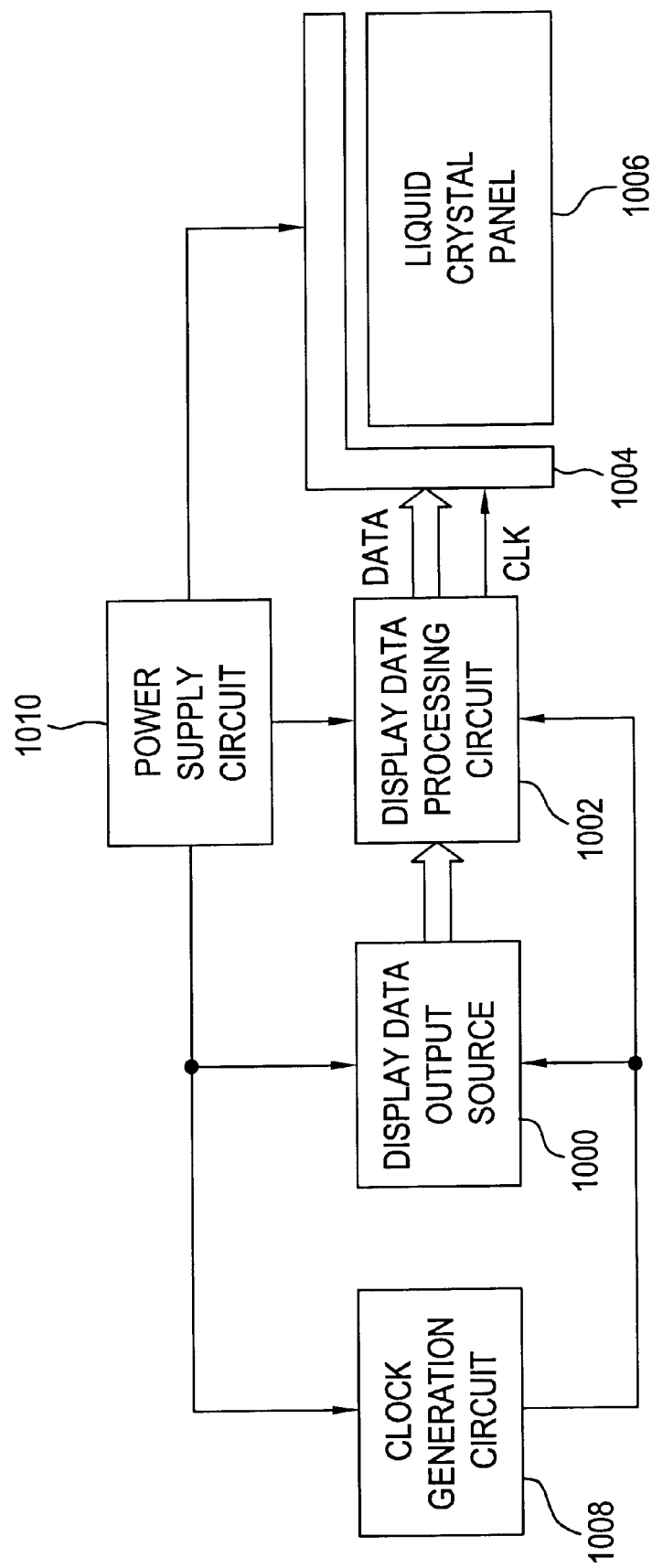
FIG. 14 shows an electronic apparatus in accordance with Embodiment 3 of the invention.

Embodiment 3 relates to an electronic apparatus including a display device as explained in Embodiments 1 and 2. FIG. 14 shows an example of its structure. The electronic apparatus of FIG. 14 includes a display data output source 1000, a display data processing circuit 1002, a drive circuit 1004, a liquid crystal panel 1006 which is one display device, a clock generation circuit 1008, and a power supply circuit 1010. Display data output source 100 includes ROM and RAM memory, a synchronizing circuit, and similar device, and it outputs display data such as video signals based on clock pulses from clock generation circuit 1008. Display data processing circuit 1002 outputs display data after having processed the data based on clock pulses from clock generation circuit 1008. This display data processing circuit 1002 can include such circuits as, for example, an amplifier/polarity-reversing circuit, a phase extension circuit, a rotation circuit, a gamma correction circuit, or a clamping circuit. Drive circuit 1004 includes a scan signal drive circuit and a data signal drive circuit, and it drive liquid crystal panel 1006. Power supply circuit 1010 supplies electrical power to each of the above circuits.

Figure 15:
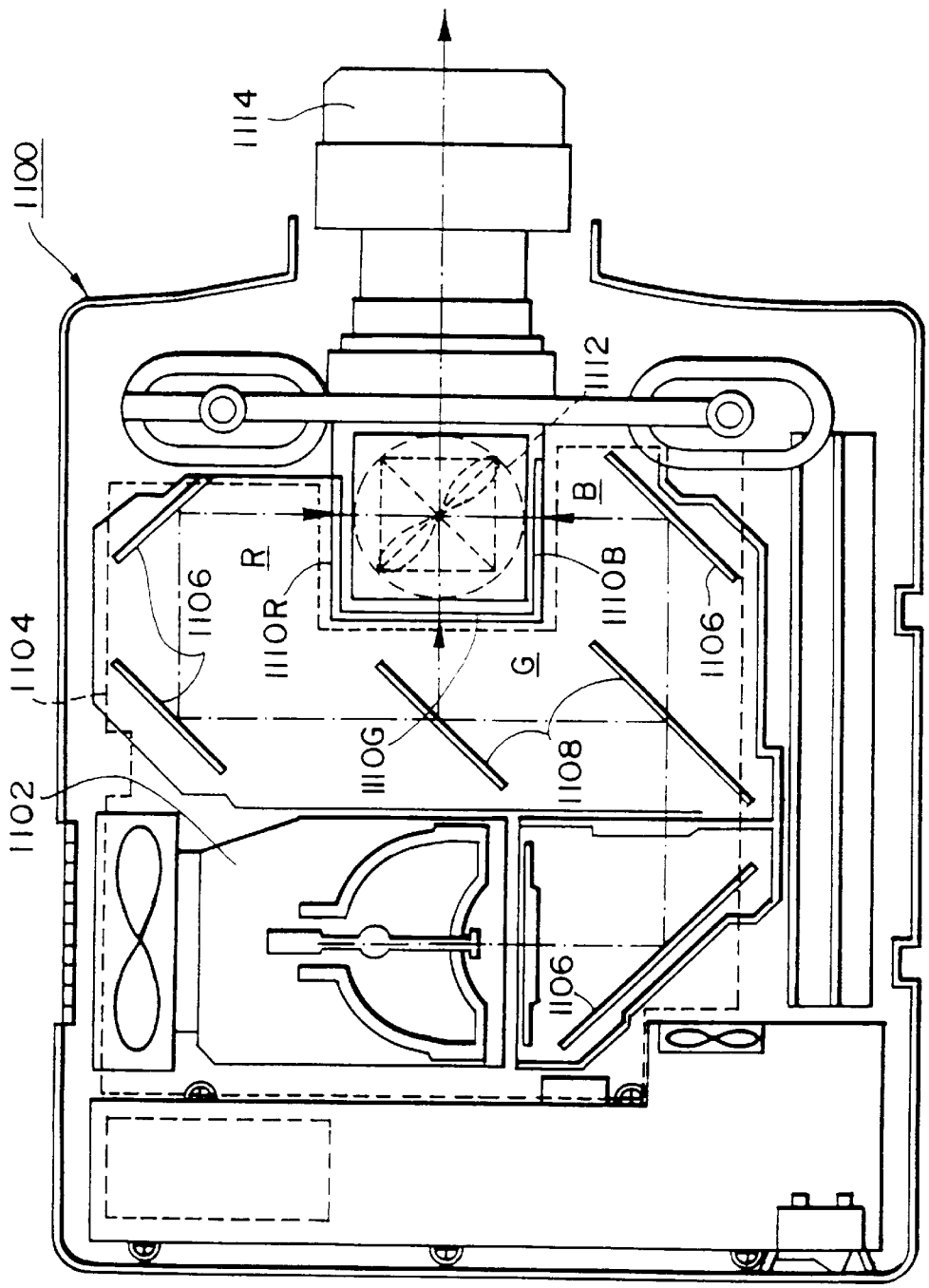
FIG. 15 shows an electronic apparatus which is a projector.
Figure 16:
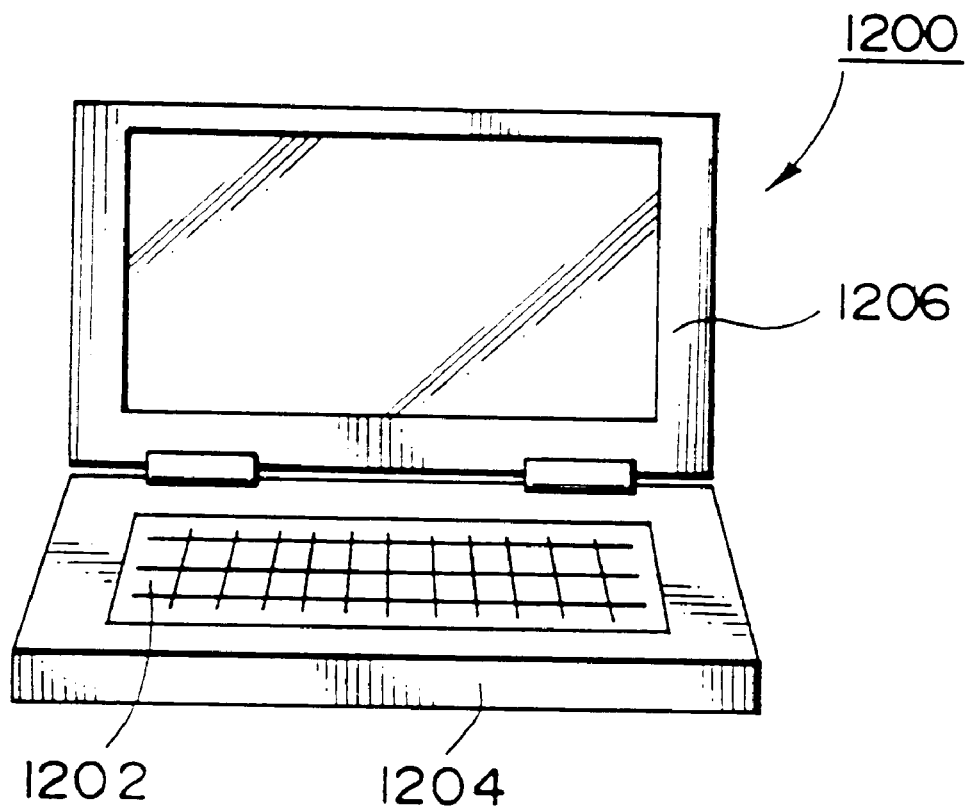
FIG. 16 shows an electronic apparatus which is a personal computer.
Figure 17:
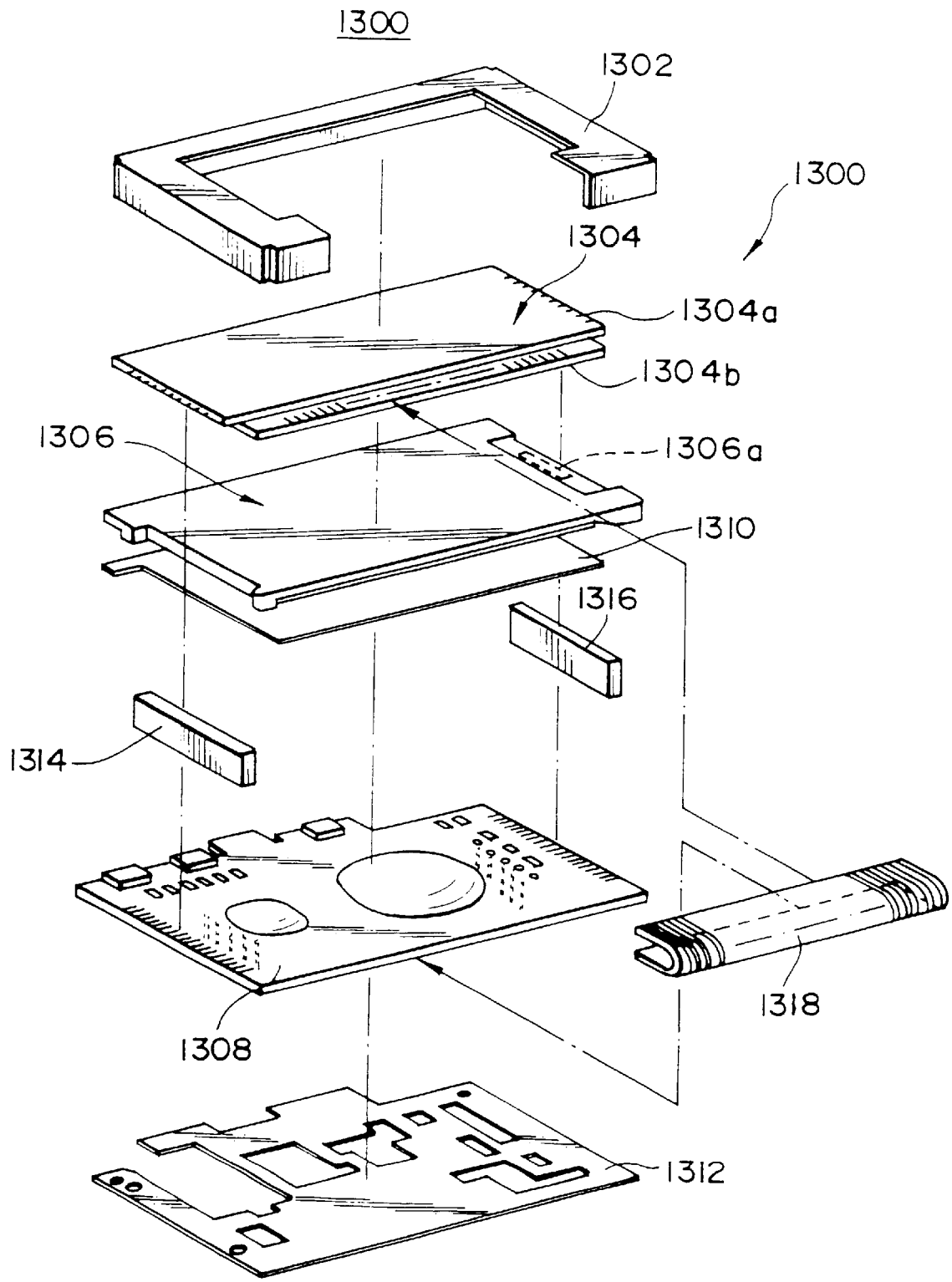
FIG. 17 shows an electronic apparatus which is a pager.

Examples of an electronic apparatus of such configuration include the liquid crystal projector shown in FIG. 15, the multimedia personal computer (PC) and engineering workstation (EWS) shown in FIG. 16, the pager shown in FIG. 17, or a portable telephone, a word processor, a television, a viewfinder-type or direct sight-type video tape recorder, an electronic notebook, an electronic desktop computer, a car navigation apparatus, a POS terminal, and an apparatus having a touch panel.

The projector shown in FIG. 15 is a projection-type projector using a transmissive-type liquid crystal panel as a light valve. The projector has an optical system such as one which uses a three-prism method. In projector 1100 in FIG. 15, the projected light which emerges from white light source lamp unit 1102 is separated into the three primary colors, red, green, and blue (RGB) by a plurality of mirrors 1106 and two dichroic mirrors 1108. The light is led to three active matrix liquid crystal panels 1110R, 1110G, and 1110B for displaying images of the various colors. Also, the light modulated by the various liquid crystal panels 1110R, 1110G, and 1110B is introduced from three directions into a dichroic prism 1112. In dichroic prism 1112, the red R and blue B light is bent 90°, the green G light proceeds directly, the images of each color are composed, and the color image is projected onto a screen, or similar device, passing through a projection lens 1114.

The personal computer 1200 shown in FIG. 16 has a main body 1204 equipped with a keyboard 1202, and a liquid crystal display screen 1206.

A metallic frame 1302, a liquid crystal display substrate 1304, a light guide equipped with a backlight 1306a, a circuit board 1308, a first and second shielding plate 1310 and 1312, two flexible conductive members 1314 and 1316, and a film carrier tape 1318 are provided in the interior of the pager 1300 shown in FIG. 17. The two flexible conductive members 1314 and 1316, and film carrier tape 1318 connect liquid crystal display substrate 1304 with circuit board 1308.

Here, liquid crystal display substrate 1304 has liquid crystal filled between two transparent substrates 1304a and 1304b. At least a bit matrix-type liquid crystal display panel is configured by this apparatus. Additionally, the drive circuit 1004 shown in FIG. 14 or a display data processing circuit 1002 can be formed on one of the transparent substrates. The circuits that are not mounted on liquid crystal display substrate 1304 can be connected to an externally attached liquid crystal display substrate, and in the case of FIG. 17, to circuit board 1308.

Figure 18:
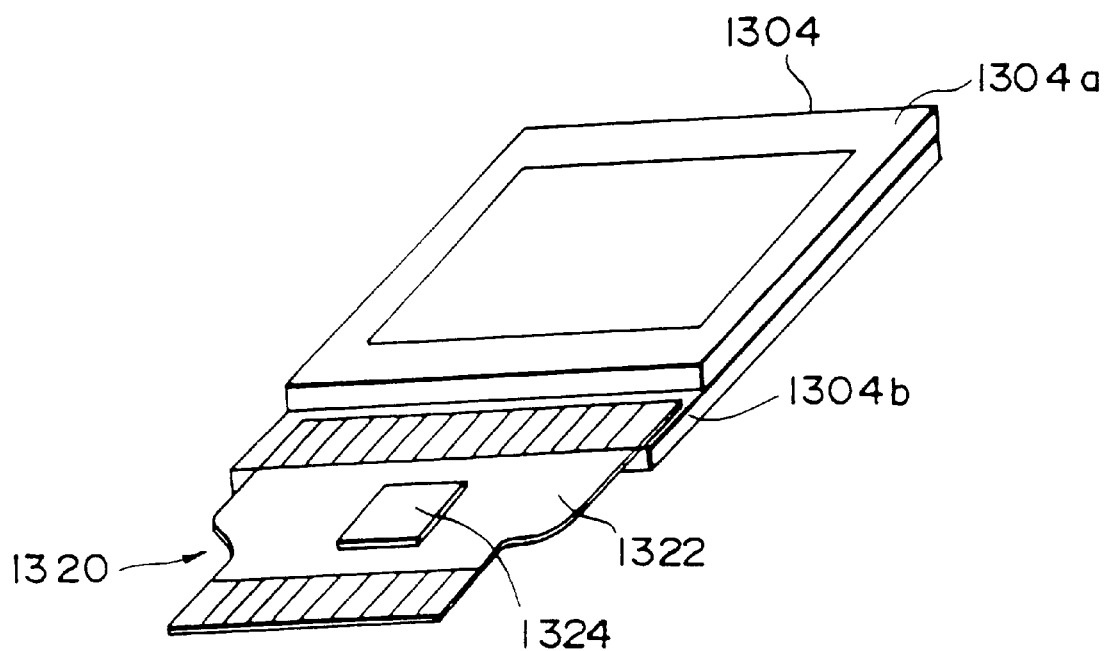
FIG. 18 shows a method of installation using TCP.

FIG. 17 shows the structure of a pager. A circuit board 1308 is required in addition to the liquid crystal substrate 1304. However, if the liquid crystal display device is used as a component for an electronic apparatus, when a drive circuit is mounted on a transparent substrate, the minimum unit of that liquid crystal display device is liquid crystal display substrate 1304. Alternatively, one having liquid crystal display substrate 1304 fixed to a metallic frame 1302 can be used as a liquid crystal display device as a component for an electronic apparatus. Furthermore, in the case of a backlight-type, the liquid crystal display device can be manufactured by assembling liquid crystal display substrate 1304 and light guide 1306 equipped with backlight 1306a inside metallic frame 1302. Instead of these, by connecting a TCP (Tape Carrier Package) having an IC chip 1324 packaged on a polyamide tape 1322 formed of a metallic conductive film on one of the two transparent substrates 1304a and 1304b composing liquid crystal display substrate 1304, as shown in FIG. 18, it can be used as a liquid crystal display device as one component for an electronic apparatus.

The invention is not limited to Embodiments 1–3 described above, and various modifications are encompassed within the scope of this invention.

For example, the structure of the switching element is not limited to those explained in the above embodiments, and various structures can be used such as, for example, an entirely backward configuration on a thin amorphous silicon thin film transistor, or the forward configuration, or a planar, forward configuration on a thin polycrystalline silicon film.

Also the method of manufacturing the liquid crystal display device is not limited to that explained in the above embodiments, and various modifications are possible, such as modifying the order of the processes, or adding other processes.

Also, the shape of the contact region is not limited to that explained in the above embodiments, and equivalent shapes can be used in this invention.

Also, the relationship equations of the capacitance ratio are not limited to those explained in the above described embodiments, and equivalent equations can be used in this invention.

Also, the above embodiments discuss cases wherein the appearance of a pixel gap is eliminated by setting the capacitance ratio. However, methods of setting parameters other than the capacitance ratio may be included in the range of equivalence to this invention as long as substantially the same operation and effect are achieved.

I claim:

1. A display device, comprising:

a pixel electrode for driving the display device; and a switching element connected to said pixel electrode via a source electrode;

wherein, if $C_X$ is the parasitic capacitance between the pixel electrode and the source electrode when a bad contact exists between said pixel electrode and the source electrode, $C_{0MAX}$ is the maximum value of the pixel capacitance held by the pixel electrode when said bad contact does not exist, $V_{LCMIN}$ is the voltage when the transmissivity at a pixel position is a minimum, and $V_{LCMAX}$ is the voltage when the transmissivity is a maximum, a capacitance ratio $RA_{C1}$ is set such that the following relationship is established:

$$RA_{C1} = C_X/C_{0MAX} > V_{LCMAX}/(V_{LCMIN} - V_{LCMAX}).$$

2. A display device according to claim 1, wherein, if $V_{LCHL}$ is the voltage when the transmissivity in said pixel position is approximately 50% of the maximum transmissivity, the capacitance ratio $RA_{C1}$ is set such that:

$$RA_{C1} = C_X/C_{0MAX} > V_{LCHL}/(V_{LCMIN} - V_{LCHL}).$$

3. A display device, comprising:

a pixel electrode for driving the display device; and a switching element connected to said pixel electrode via a source electrode;

wherein, if $C_X$ is the parasitic capacitance between the pixel electrode and the source electrode when a bad contact exists between said pixel electrode and the source electrode, $C_{0MAX}$ is the maximum value of the pixel capacitance held by the pixel electrode when said bad contact does not exist, $V_{LCMIN}$ is the voltage when the transmissivity at a pixel position is a minimum, and $V_{LCMAX}$ is the voltage when the transmissivity is a maximum, a capacitance ratio $RA_{C2}$ is set such that the following relationship is established:

$$RA_{C2} = C_X/C_{0MAX} > V_{LCMAX}/(V_{LCMIN} - V_{LCMAX}).$$

4. A display device, comprising:

a pixel electrode for driving the display device; and a switching element connected to said pixel electrode via a source electrode;

wherein, if $C_X$ is the parasitic capacitance between the pixel electrode and the source electrode when a bad contact exists between said pixel electrode and the source electrode, $C_{0MAX}$ is the maximum value of the pixel capacitance held by the pixel electrode when said bad contact does not exist, $V_{LCMIN}$ is the voltage when the transmissivity at a pixel position is a minimum, and $V_{LCMAX}$ is the voltage when the transmissivity is a maximum, a capacitance ratio $RA_{C1}$ is set such that the following relationship is established:

$$RA_{C1} = C_X/C_{0MAX} > V_{LCMIN}/(V_{LCMIN} - V_{LCMAX}).$$

5. The display device according to claim 4, wherein, if $V_{LCHL}$ is the voltage when the transmissivity in said pixel position is approximately 50% of the maximum transmissivity, the capacitance ratio $RA_{C1}$ is set such that:

$$RA_{C1}=C_X/C_{0MAX}>V_{LCHL}/(V_{LCMAX}-V_{LCHL}).$$

6. A display device, comprising:

a pixel electrode for driving the display device; and a switching element connected to said pixel electrode via a source electrode;

wherein, if $C_X$ is the parasitic capacitance between the pixel electrode and the source electrode when a bad contact exists between said pixel electrode and the source electrode, $C_{0MAX}$ is the maximum value of the pixel capacitance held by the pixel electrode when said bad contact does not exist, $V_{LCMIN}$ is the voltage when the transmissivity at a pixel position is a minimum, and $V_{LCMAX}$ is the voltage when the transmissivity is a maximum, a capacitance ratio $RA_{C2}$ is set such that the following relationship is established:

$$RA_{C2}=C_X/C_{0MAX}>V_{LCMIN}/(V_{LCMIN}-V_{LCMAX}).$$

7. A display device, comprising:

a pixel electrode for driving the display device; and a switching element connected to said pixel electrode via a source electrode;

wherein, the display device includes a contact region such that it is included in either a portion of or the entire pixel electrode edge region, which is a region between one signal line connected to said switching element and a signal line adjacent to said one signal line, and being a region following a scan line connected to said switching element, whereby said pixel electrode is connected to said source electrode in said contact region.

8. The display device according to claim 7, wherein, if $C_X$ is the parasitic capacitance between the pixel electrode and the source electrode when a bad contact exists between said pixel electrode, $C_{0MAX}$ is the maximum value of the pixel capacitance held by the pixel electrode when said bad contact does not exist, $V_{LCMIN}$ is the voltage when the transmissivity at a pixel position is a minimum, and $V_{LCMAX}$ is the voltage when the transmissivity is a maximum, a capacitance ratio $RA_{C1}$ is set such that the following relationship is established:

$$RA_{C1}=C_X/C_{0MAX}>V_{LCMAX}/(V_{LCMIN}-V_{LCMAX}).$$

9. The display device according to claim 7, wherein, if $C_X$ is the parasitic capacitance between the pixel electrode and the source electrode when a bad contact exists between said pixel electrode, $C_{0MAX}$ is the maximum value of the pixel capacitance held by the pixel electrode when said bad contact does not exist, $V_{LCMIN}$ is the voltage when the transmissivity at the pixel position is a minimum, and $V_{LCMAX}$ is the voltage when the transmissivity is a maximum, a capacitance ratio $RA_{C1}$ is set such that the following relationship is established:

$$RA_{C1}=C_X/C_{0MAX}>V_{LCMIN}/(V_{LCMIN}-V_{LCMAX}).$$

10. The display device according to claim 7, wherein, said contact region includes a rectangular contact hole, a long side of which follows said scan line, and said pixel electrode and source electrode may be connected via said rectangular contact hole.

11. The display device according to claim 7, wherein said contact region includes a plurality of contact holes, the contact holes connect said pixel electrode and said source electrode.

12. The display device according to claim 7, wherein a black matrix region is provided to cover either a portion of or the entire contact region.

13. An electronic apparatus including a display device according to claim 1.

14. A method of manufacturing a display device that includes a pixel electrode for driving the display device, and a switching element connected to said pixel electrode via a source electrode, comprising the steps of:

forming said source electrode;

forming an insulation film over said source electrode;

forming a contact region for connecting at least said source electrode and said pixel electrode; and forming said pixel electrode;

whereby, if $C_X$ is the parasitic capacitance between the pixel electrode and the source electrode when a bad contact exists between said pixel electrode and the source electrode, $C_{0MAX}$ is the maximum value of the pixel capacitance held by the pixel electrode when said bad contact does not exist, $V_{LCMIN}$ is the voltage when the transmissivity at the pixel position is a minimum, and $V_{LCMAX}$ is the voltage when the transmissivity is a maximum, a capacitance ratio $RA_{C1}$ is set such that the following relationship is established:

$$RA_{C1}=C_X/C_{0MAX}>V_{LCMAX}/(V_{LCMIN}-V_{LCMAX}).$$

15. A method of manufacturing a display device that includes a pixel electrode for driving the display device, and a switching element connected to said pixel electrode via a source electrode, comprising the steps of:

forming said source electrode;

forming an insulation film over said source electrode;

forming a contact region for connecting at least said source electrode and said pixel electrode; and forming said pixel electrode;

whereby, if $C_X$ is the parasitic capacitance between the pixel electrode and the source electrode when a bad contact exists between said pixel electrode and the source electrode, $C_{0MAX}$ is the maximum value of the pixel capacitance held by the pixel electrode when said bad contact does not exist, $V_{LCMIN}$ is the voltage when the transmissivity at the pixel position is a minimum, and $V_{LCMAX}$ is the voltage when the transmissivity is a maximum, a capacitance ratio $RA_{C1}$ is set such that the following relationship is established:

$$RA_{C1}=C_X/C_{0MAX}>V_{LCMIN}/(V_{LCMIN}-V_{LCMAX}).$$

16. A method of manufacturing a display device that includes a pixel electrode for driving the display device, and a switching element connected to said pixel electrode via a source electrode, comprising the steps of:

forming said source electrode;

forming an insulation film over said source electrode;

forming a contact region for connecting at least said source electrode and said pixel electrode; and forming said pixel electrode;

whereby, the display device includes a contact region such that it is included in either a portion of or the entire pixel electrode edge region, which is a region between one signal line connected to said switching element and a signal line adjacent to said one signal line, and being a region following a scan line connected to said switching element, whereby said pixel electrode is connected to said source electrode in said contact region.

17. The method according to claim 16, wherein, if $C_X$ is the parasitic capacitance between the pixel electrode and the source electrode when a bad contact exists between said pixel electrode, $C_{0MAX}$ is the maximum value of the pixel capacitance held by the pixel electrode when said bad contact does not exist, $V_{LCMIN}$ is the voltage when the transmissivity at the pixel position is a minimum, and $V_{LCMAX}$ is the voltage when the transmissivity is a maximum, a capacitance ratio $RA_{C1}$ is set such that the following relationship is established:

$$RA_{C1} = C_X/C_{0MAX} > V_{LCMAX}/(V_{LCMIN} - V_{LCMAX}).$$

18. The method according to claim 16, wherein, if $C_X$ is the parasitic capacitance between the pixel electrode and the source electrode when a bad contact exists between said pixel electrode, $C_{0MAX}$ is the maximum value of the pixel capacitance held by the pixel electrode when said bad contact does not exist, $V_{LCMIN}$ is the voltage when the transmissivity at the pixel position is a minimum, and $V_{LCMAX}$ is the voltage when the transmissivity is a maximum, a capacitance ratio $RA_{C1}$ is set such that the following relationship is established:

$$RA_{C1} = C_X/C_{0MAX} > V_{LCMIN}/(V_{LCMIN} - V_{LCMAX}).$$

19. The method according to claim 14, wherein, the step of forming said contact region includes concurrently forming the contact region for connecting an electrode formed of the same material as the gate electrode of said switching element and a given electrode, and the contact region for connecting said source electrode and said pixel electrode.

* * * * *